(12) United States Patent
Nakaguma et al.

(10) Patent No.: US 10,908,891 B2
(45) Date of Patent: Feb. 2, 2021

(54) SOFTWARE UPDATE DEVICE AND SOFTWARE UPDATE SYSTEM

(71) Applicant: Clarion Co., Ltd., Saitama (JP)

(72) Inventors: Kyouichi Nakaguma, Tokyo (JP); Tomochika Ozaki, Tokyo (JP); Hidetoshi Teraoka, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 16/308,621

(22) PCT Filed: Mar. 29, 2017

(86) PCT No.: PCT/JP2017/012947
§ 371 (c)(1),
(2) Date: Dec. 10, 2018

(87) PCT Pub. No.: WO2017/217075
PCT Pub. Date: Dec. 21, 2017

(65) Prior Publication Data
US 2019/0155594 A1     May 23, 2019

(30) Foreign Application Priority Data

Jun. 13, 2016 (JP) ................................ 2016-117250

(51) Int. Cl.
*G06F 8/65*     (2018.01)
*B60R 16/02*     (2006.01)
(Continued)

(52) U.S. Cl.
CPC ................ *G06F 8/65* (2013.01); *B60R 16/02* (2013.01); *G06F 9/445* (2013.01); *G06F 11/00* (2013.01);
(Continued)

(58) Field of Classification Search
CPC .................................... G06F 8/65; G06F 8/66
See application file for complete search history.

(56) References Cited

U.S. PATENT DOCUMENTS

2008/0059958 A1    3/2008   Bolanowski
2011/0166677 A1*   7/2011   Bromley .............. G05B 19/409
                                                       700/83

(Continued)

FOREIGN PATENT DOCUMENTS

JP     2004-206390 A    7/2004
JP     2006-242945 A    9/2006
(Continued)

OTHER PUBLICATIONS

Yutaka, EPO Translated JP2007004499,Jan. 11, 2007,pp. 1-21 (Year: 2007).*

(Continued)

*Primary Examiner* — Duy Khuong T Nguyen
(74) *Attorney, Agent, or Firm* — Crowel & Moring LLP

(57) ABSTRACT

A software update device includes: a memory unit for storing information about a plurality of HMI devices each including a display device; a selection unit for selecting at least one HMI device among the plurality of HMI devices; an update unit for updating software of an in-vehicle device; and a transmission unit for sending a notification message regarding the update to the one HMI device.

11 Claims, 26 Drawing Sheets

(51) Int. Cl.

| | | |
|---|---|---|
| *G06F 13/00* | (2006.01) | |
| *G06F 9/445* | (2018.01) | |
| *G06F 11/00* | (2006.01) | |
| *G06F 21/57* | (2013.01) | |
| *H04L 29/08* | (2006.01) | |

(52) U.S. Cl.
 CPC .............. *G06F 13/00* (2013.01); *G06F 21/57* (2013.01); *H04L 67/34* (2013.01)

(56) References Cited

U.S. PATENT DOCUMENTS

| | | | | |
|---|---|---|---|---|
| 2015/0154015 | A1* | 6/2015 | Ukai | ................. H04M 1/72525 717/170 |
| 2015/0363210 | A1* | 12/2015 | Wehrman | .................. G06F 8/65 701/31.5 |
| 2016/0147525 | A1 | 5/2016 | Choi | |
| 2016/0371077 | A1* | 12/2016 | Moeller | .................. G06F 8/654 |
| 2019/0108010 | A1* | 4/2019 | Tillman | ................... H04L 67/34 |
| 2019/0325666 | A1* | 10/2019 | Teraoka | .............. H04L 12/4625 |

FOREIGN PATENT DOCUMENTS

| | | |
|---|---|---|
| JP | 2007-4499 A | 1/2007 |
| JP | 2008-508623 A | 3/2008 |

OTHER PUBLICATIONS

International Search Report (PCT/ISA/210) issued in PCT Application No. PCT/JP2017/012947 dated Jun. 20, 2017 with English translation (three (3) pages).

Japanese-language Written Opinion (PCT/ISA/237) issued in PCT Application No. PCT/JP2017/012947 dated Jun. 20, 2017 (four (4) pages).

Japanese-language Office Action issued in counterpart Japanese Application No. 2016-117250 dated Jan. 7, 2020 with English translation (eight (8) pages).

Extended European Search Report issued in European Application No. 17812981.3 dated Jul. 1, 2020 (12 pages).

Partial Supplementary European Search Report issued in European Application No. 17812981.3 dated Feb. 5, 2020 (14 pages).

\* cited by examiner

[FIG. 1]
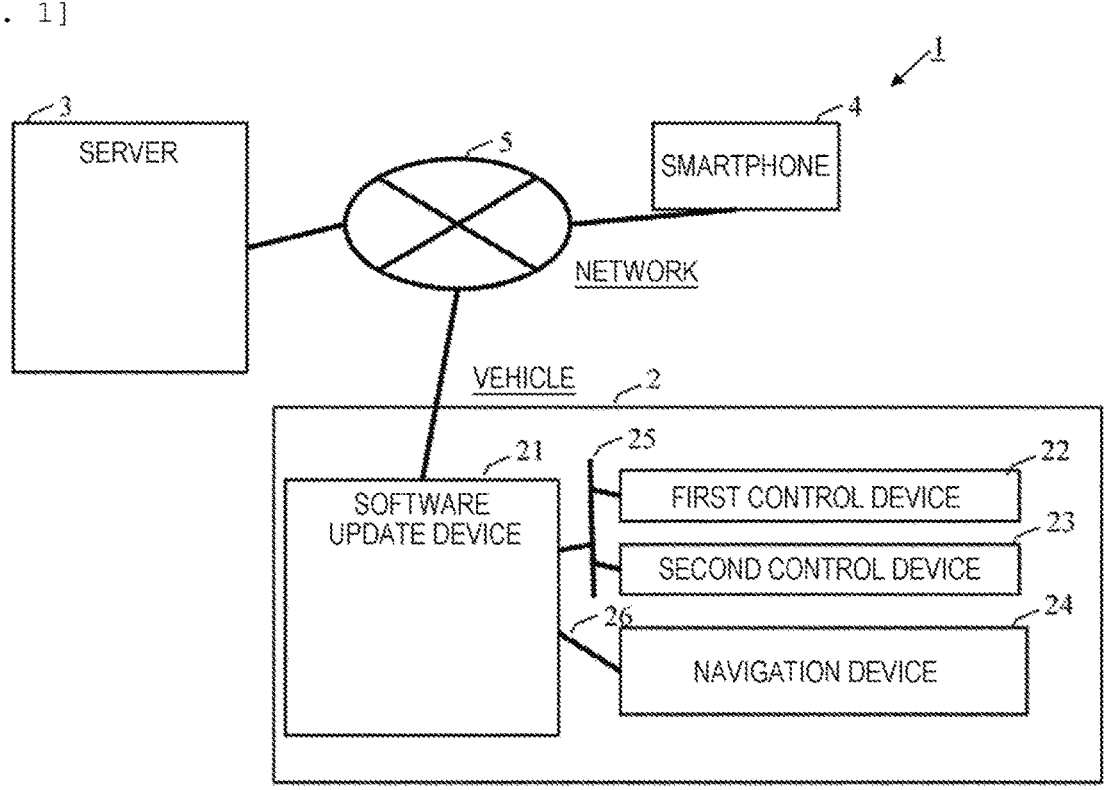

[FIG. 2]
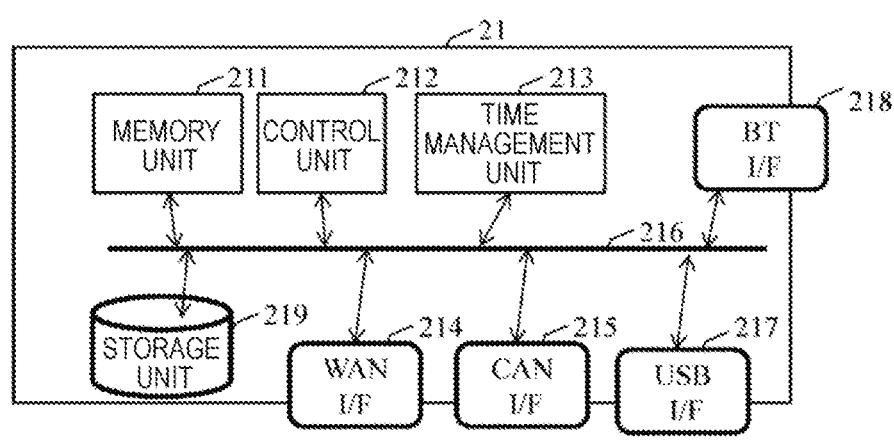

[FIG. 3]
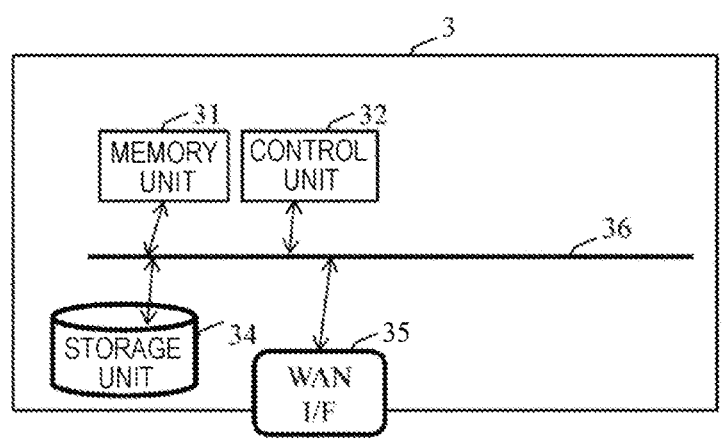

[FIG. 4]
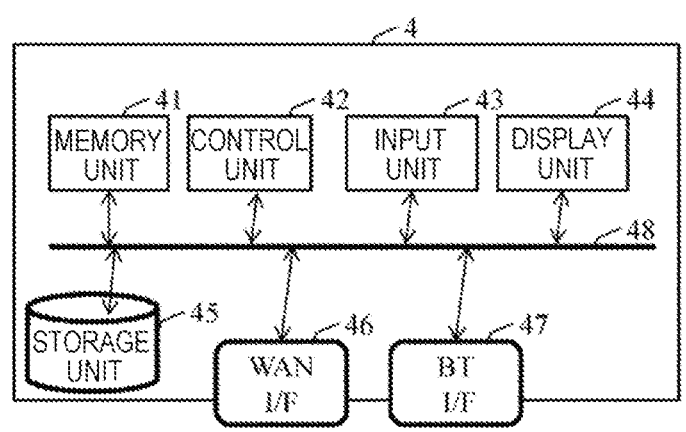

[FIG. 5]
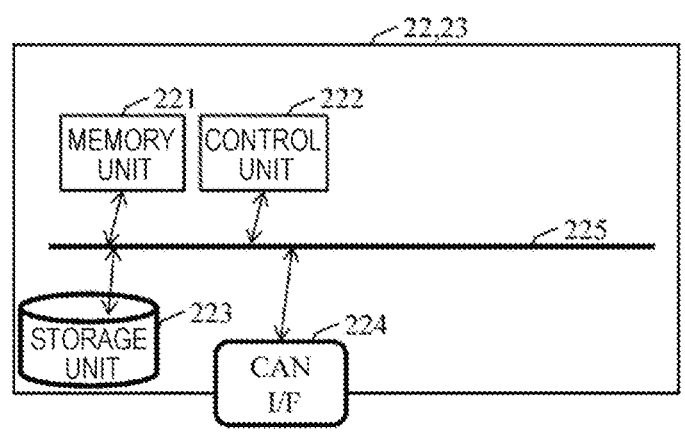

[FIG. 6]
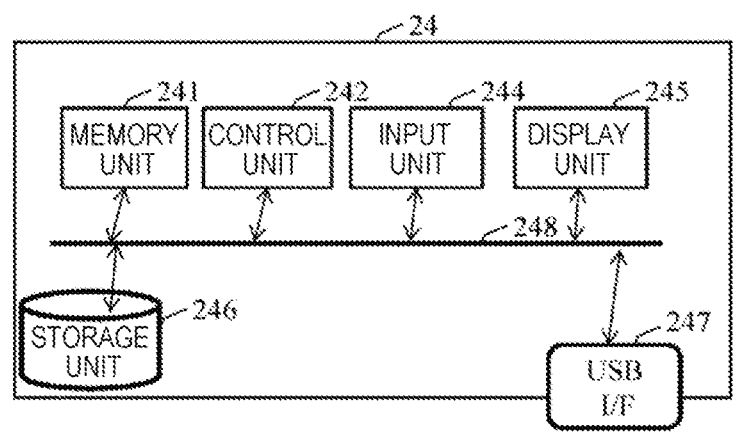

[FIG. 7]
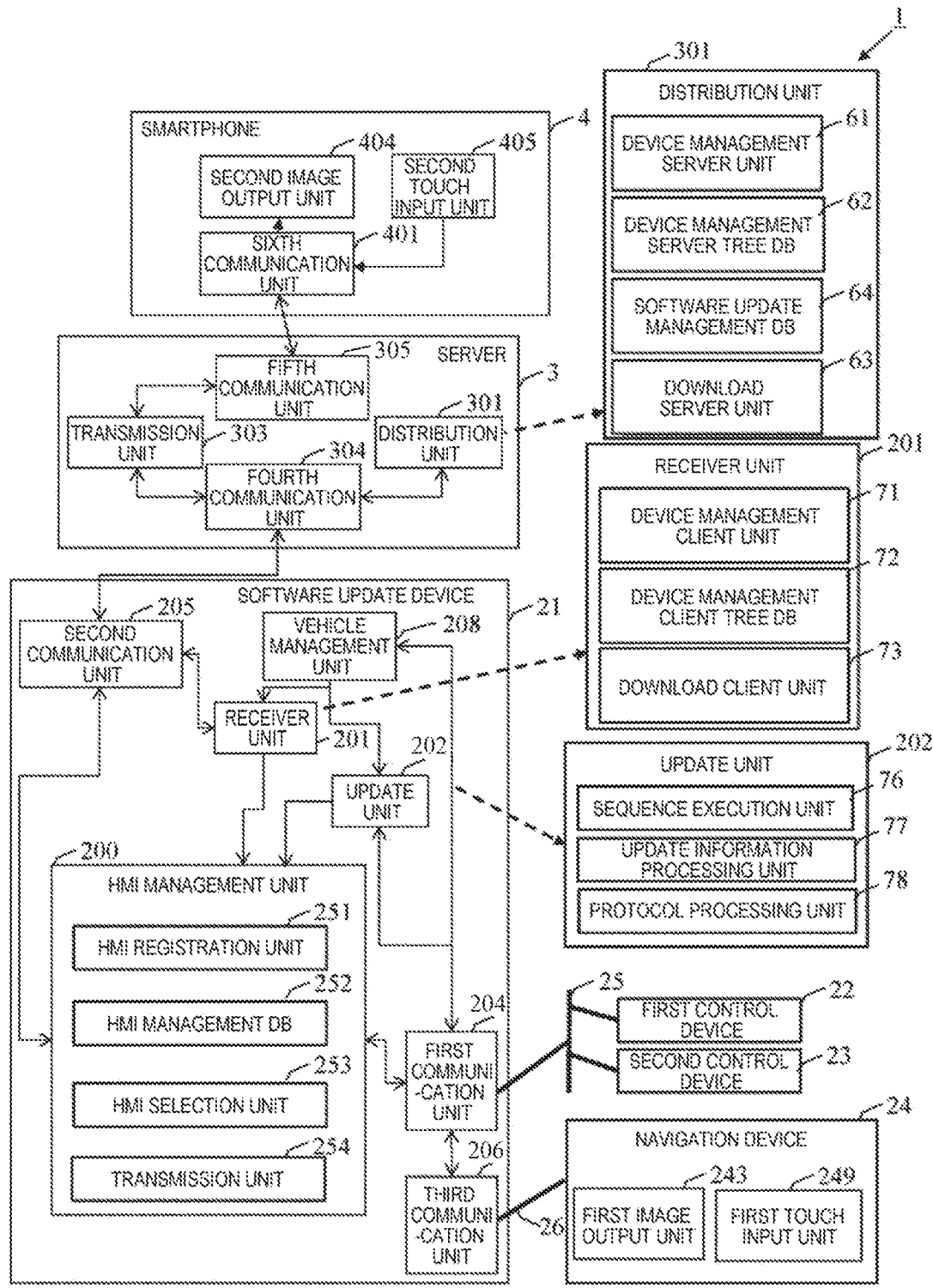

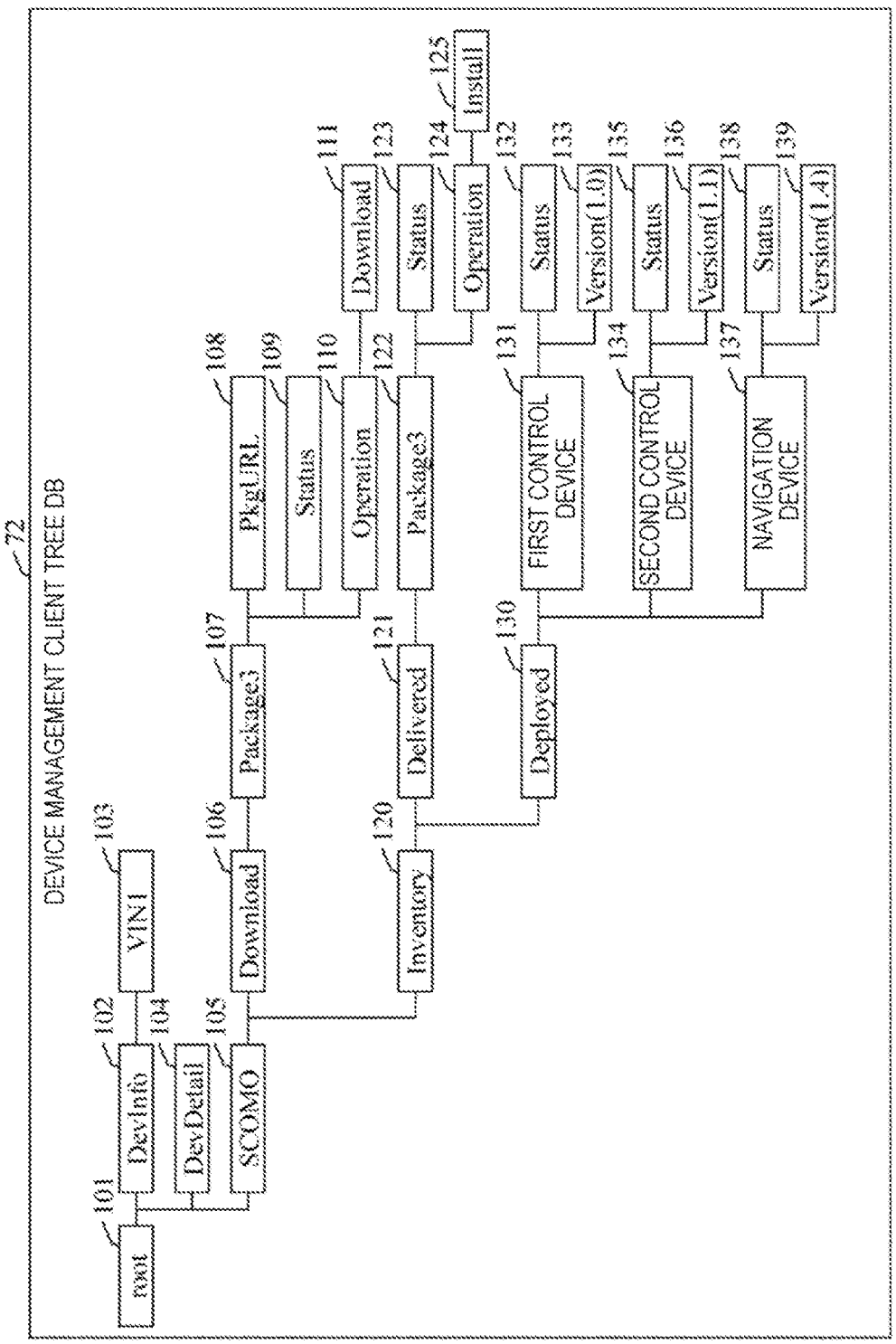
[FIG. 8]

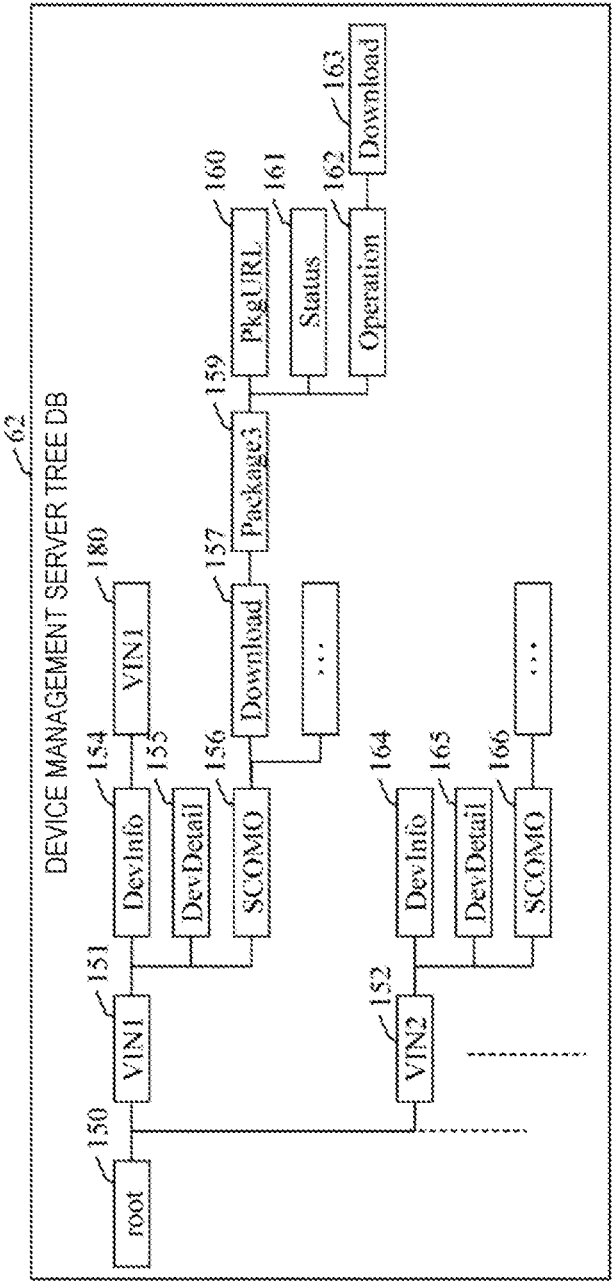
[FIG. 9]

[FIG. 10]

SOFTWARE UPDATE MANAGEMENT DB — 64

| VEHICLE ID | ECU ID | Version | Package | PkgURL |
|---|---|---|---|---|
| VIN1 | CONTROL DEVICE 1 | 1.0 | package1 | xxxx |
| VIN1 | CONTROL DEVICE 2 | 1.1 | package2 | yyyy |
| VIN1 | NAVIGATION DEVICE | 1.5 | package3 | zzzz |

181  182  183  184  185

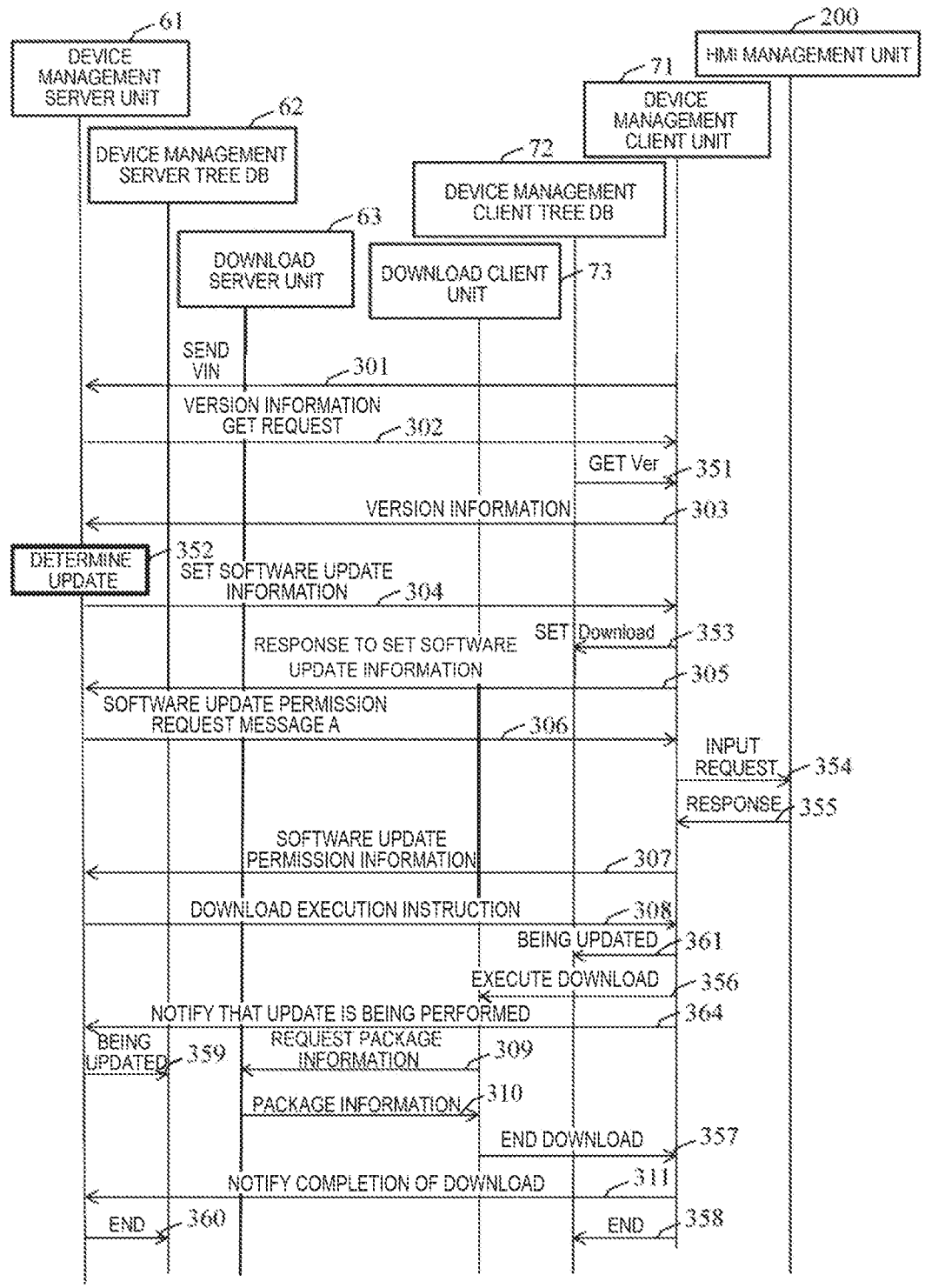
[FIG. 11]

[FIG. 12]
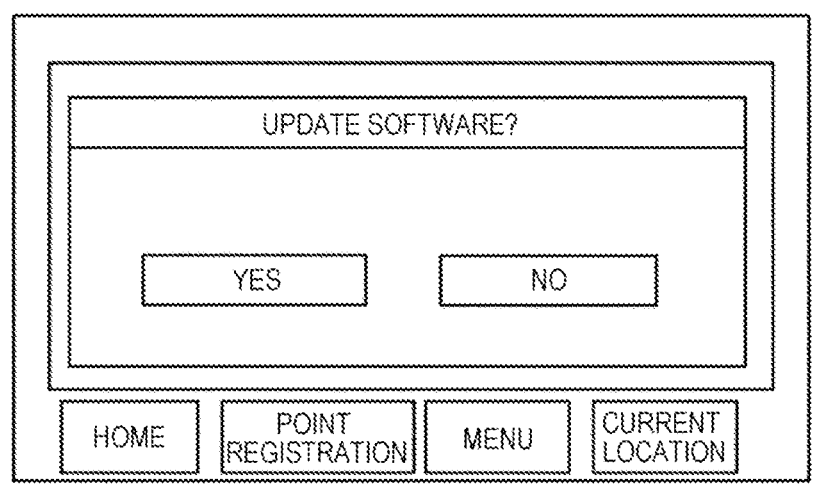

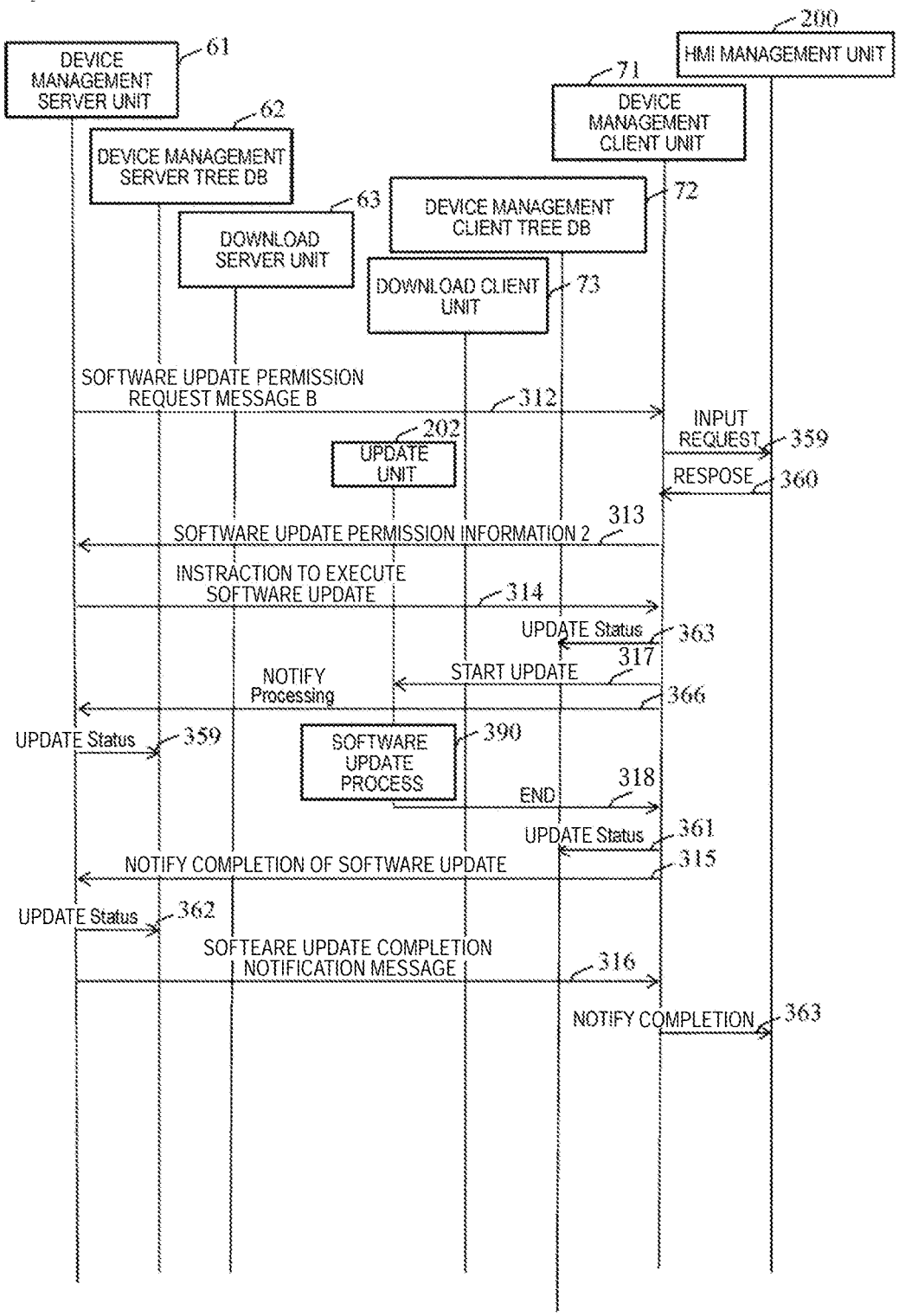
[FIG. 13]

[FIG. 14]
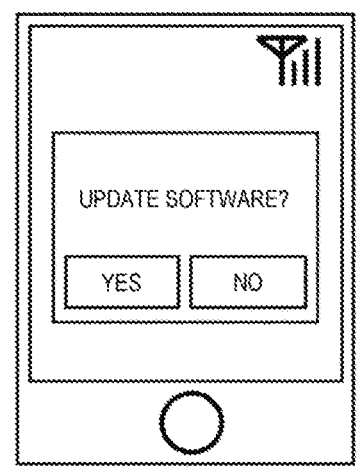

[FIG. 15]
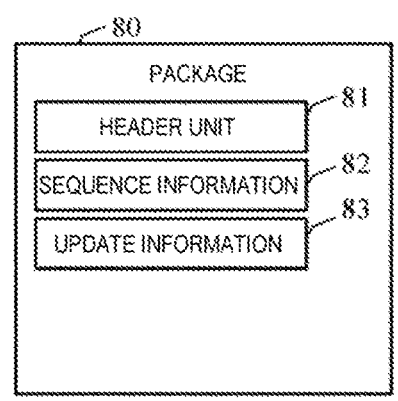

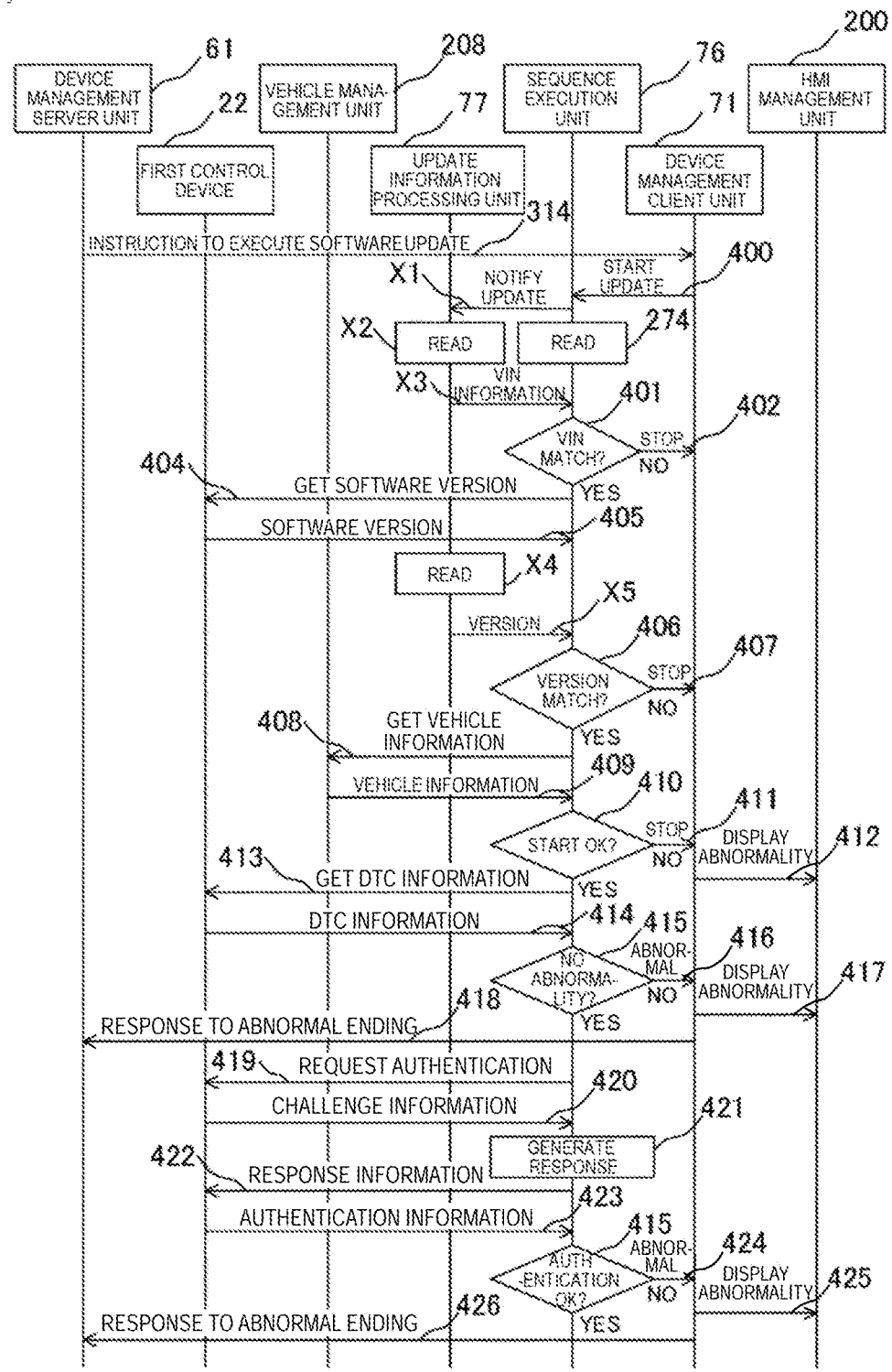
[FIG. 16]

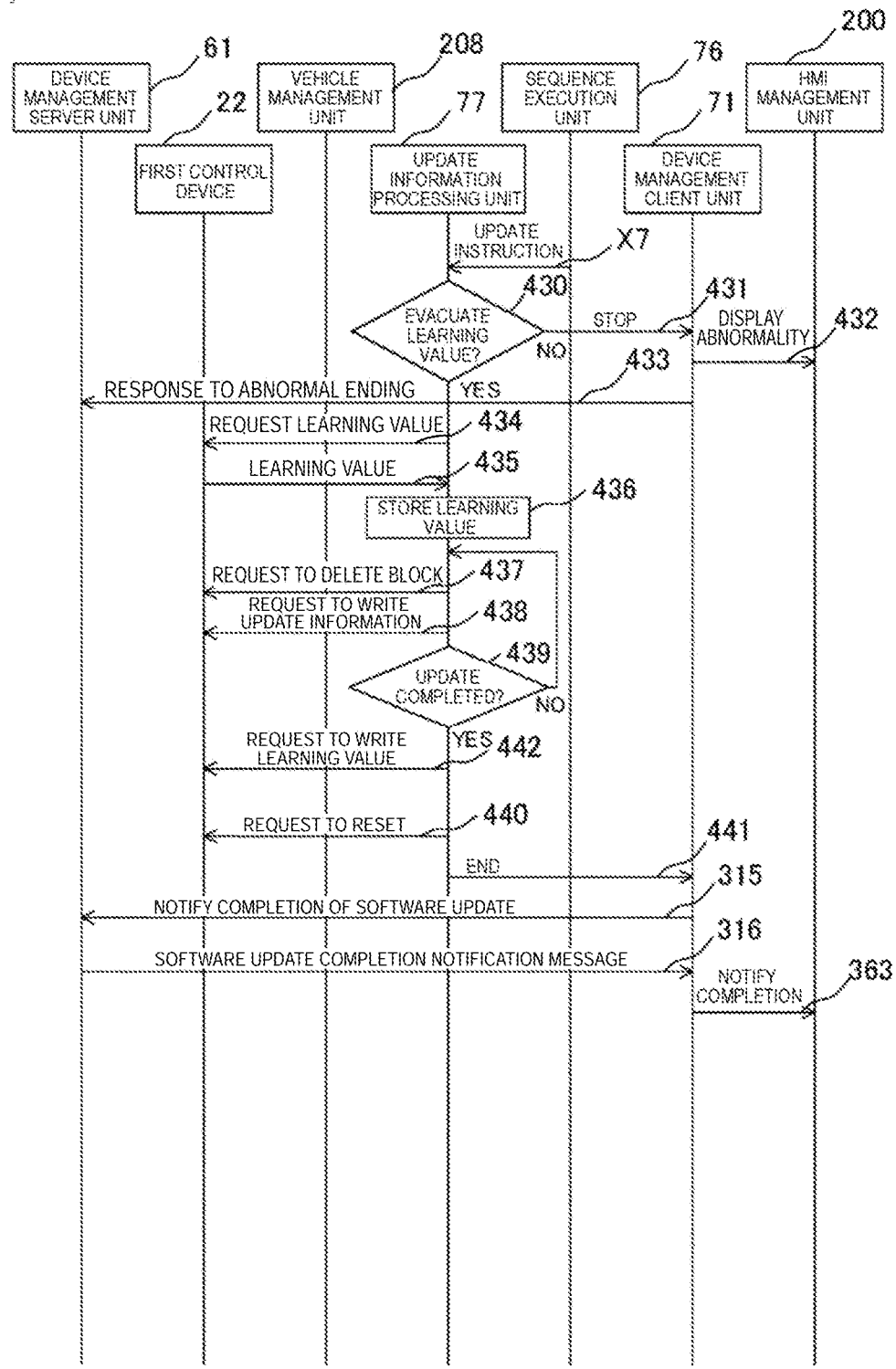
[FIG. 17]

[FIG. 18]

| DEVICE TYPE | DESTINATION ADDRESS | INPUT DEVICE FLAG | IN-USE FLAG | OUT-OF-VEHICLE FLAG |
|---|---|---|---|---|
| IVI | 192.168.0.5 | ○ | × | × |
| SMARTPHONE | 192.168.1.5 | ○ | ○ | ○ |
| HMD | 192.168.2.5 | × | × | × |

HMI MANAGEMENT DB

[FIG. 19]
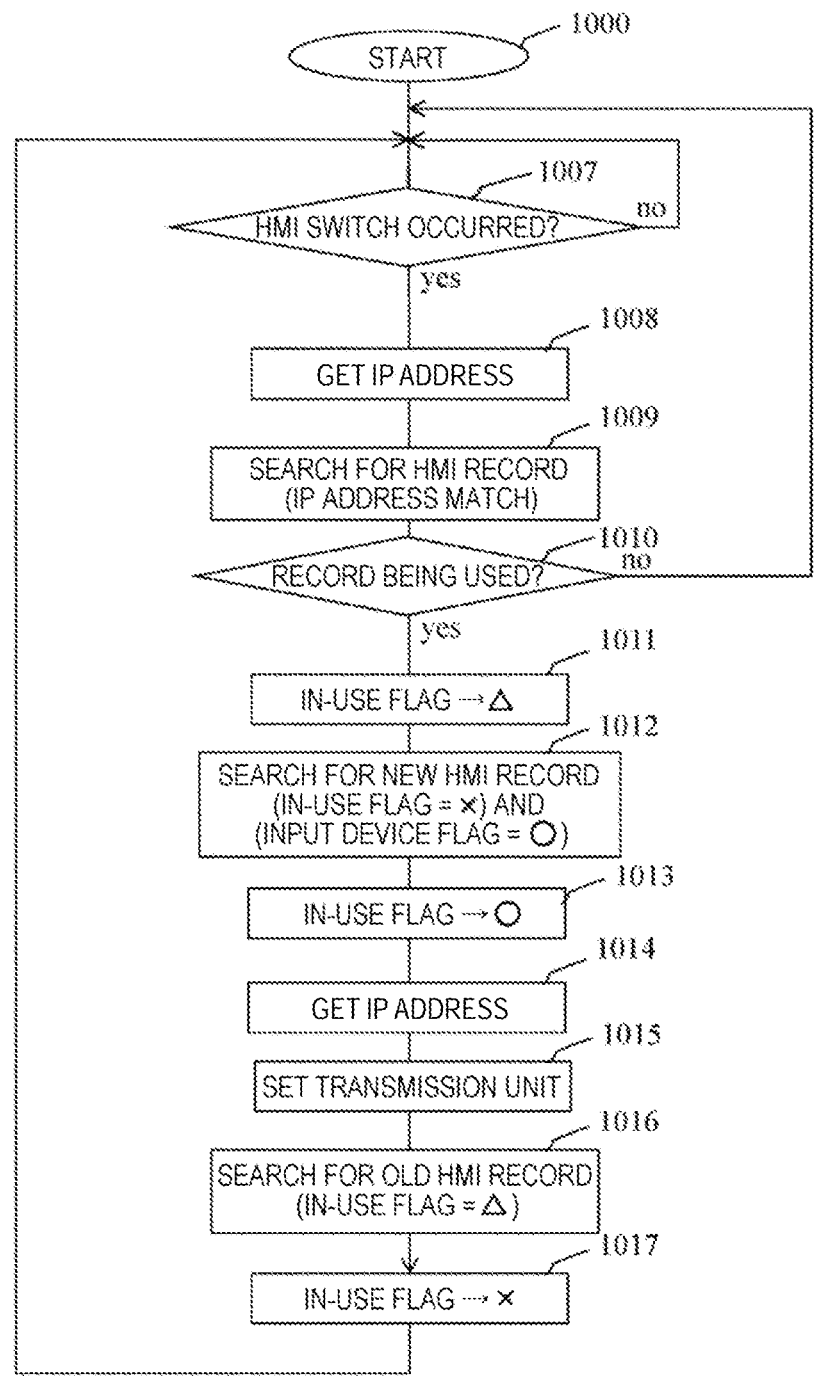

[FIG. 20]
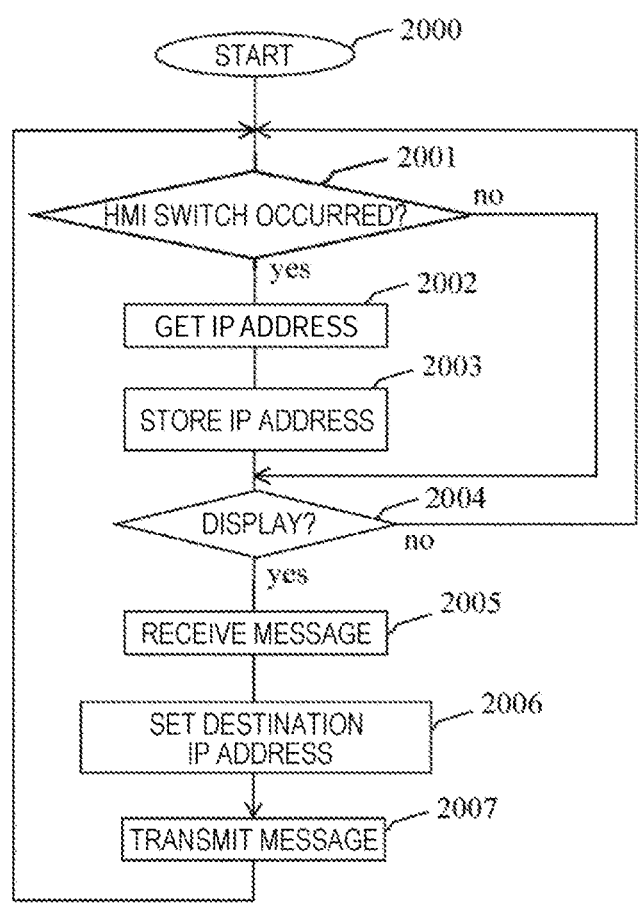

[FIG. 21]
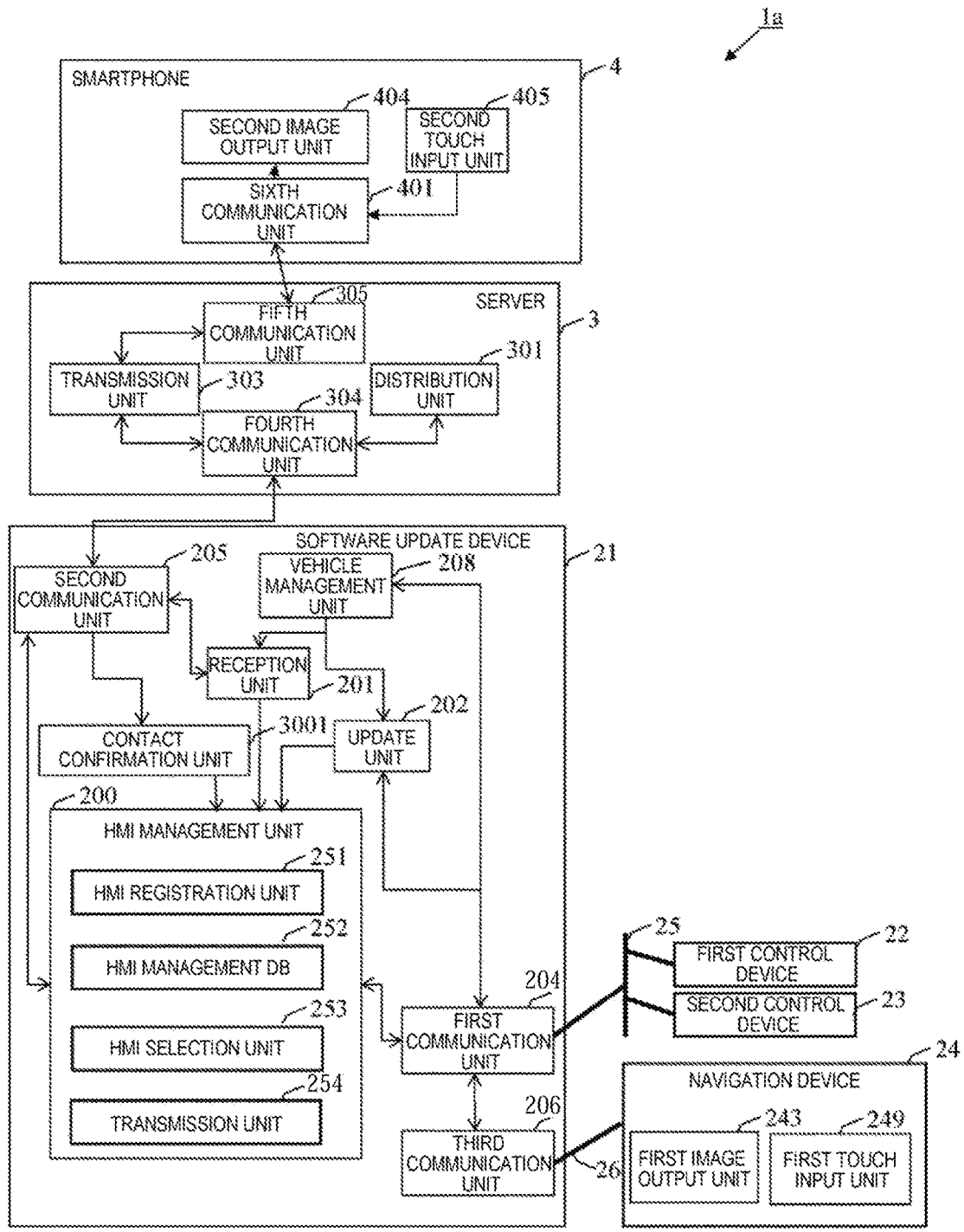

[FIG. 22]
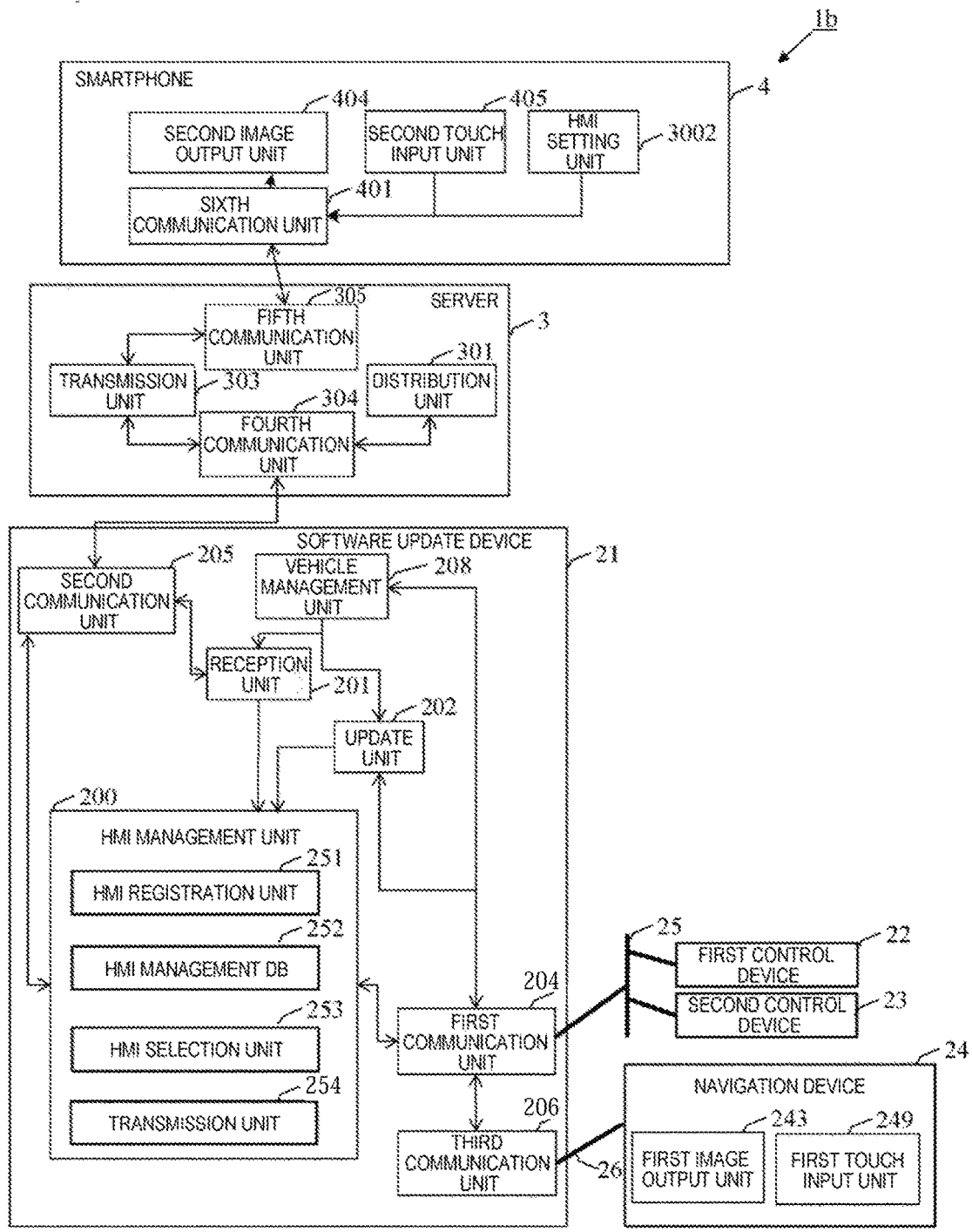

[FIG. 23]
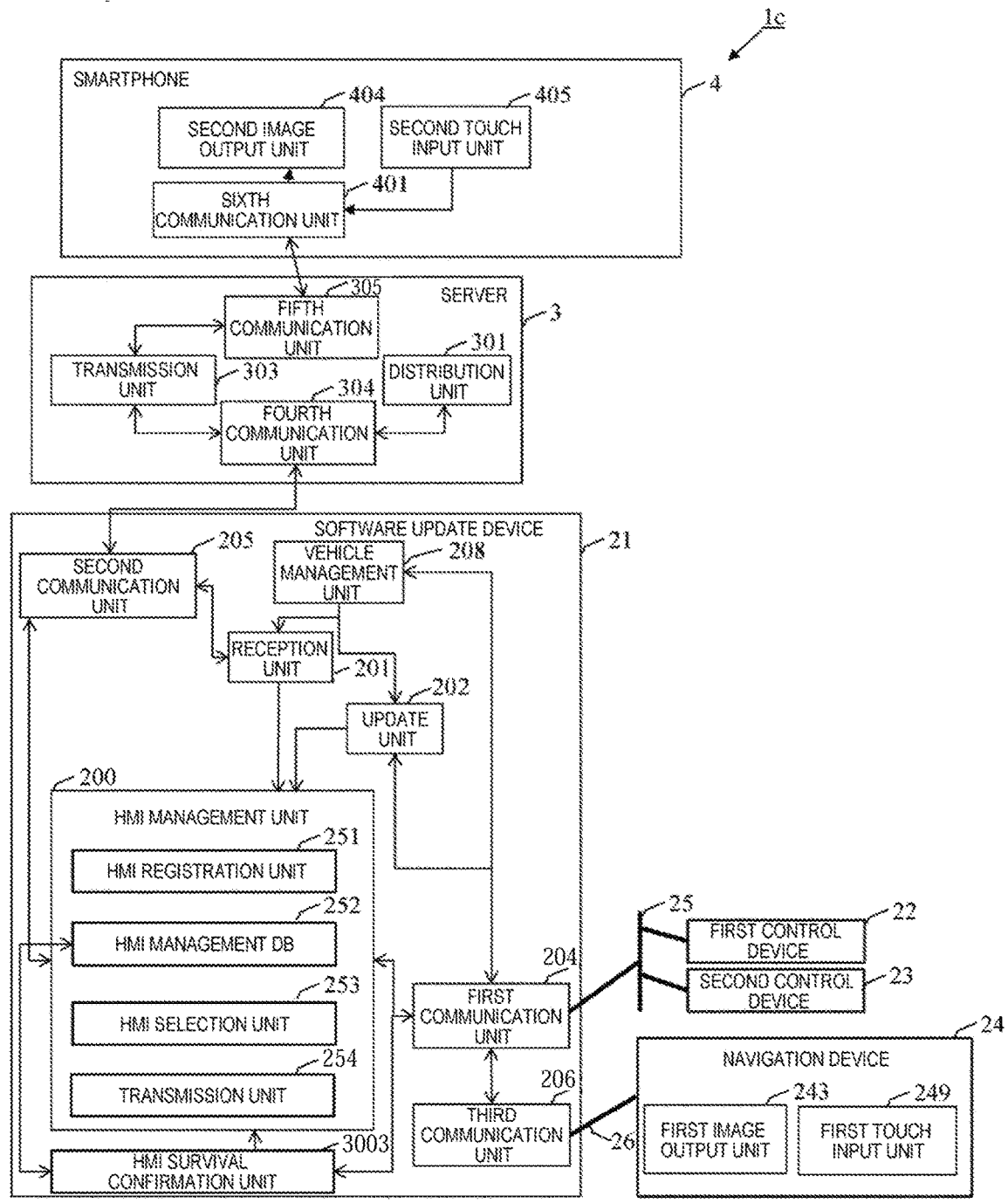

[FIG. 24]
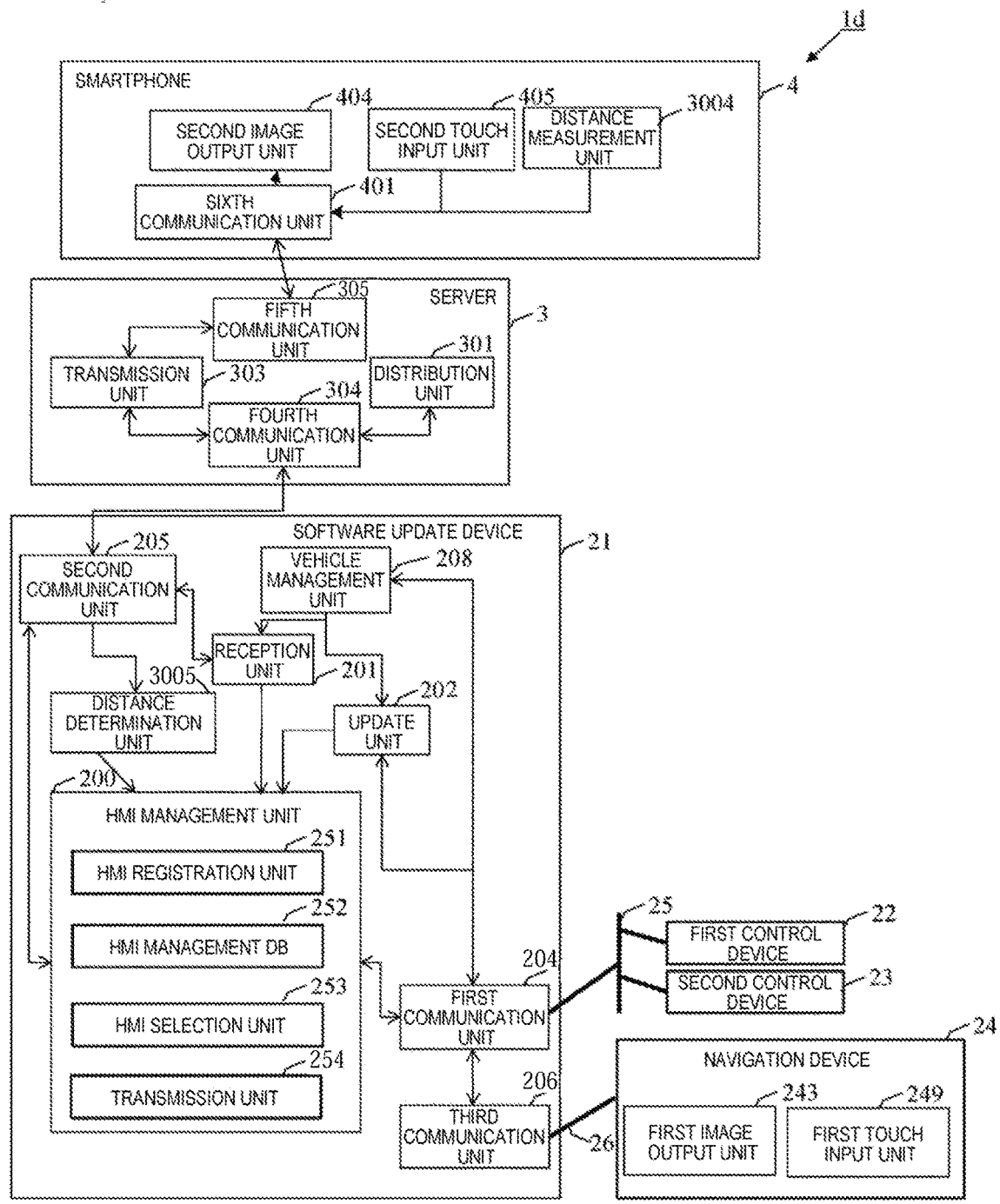

[FIG. 25]
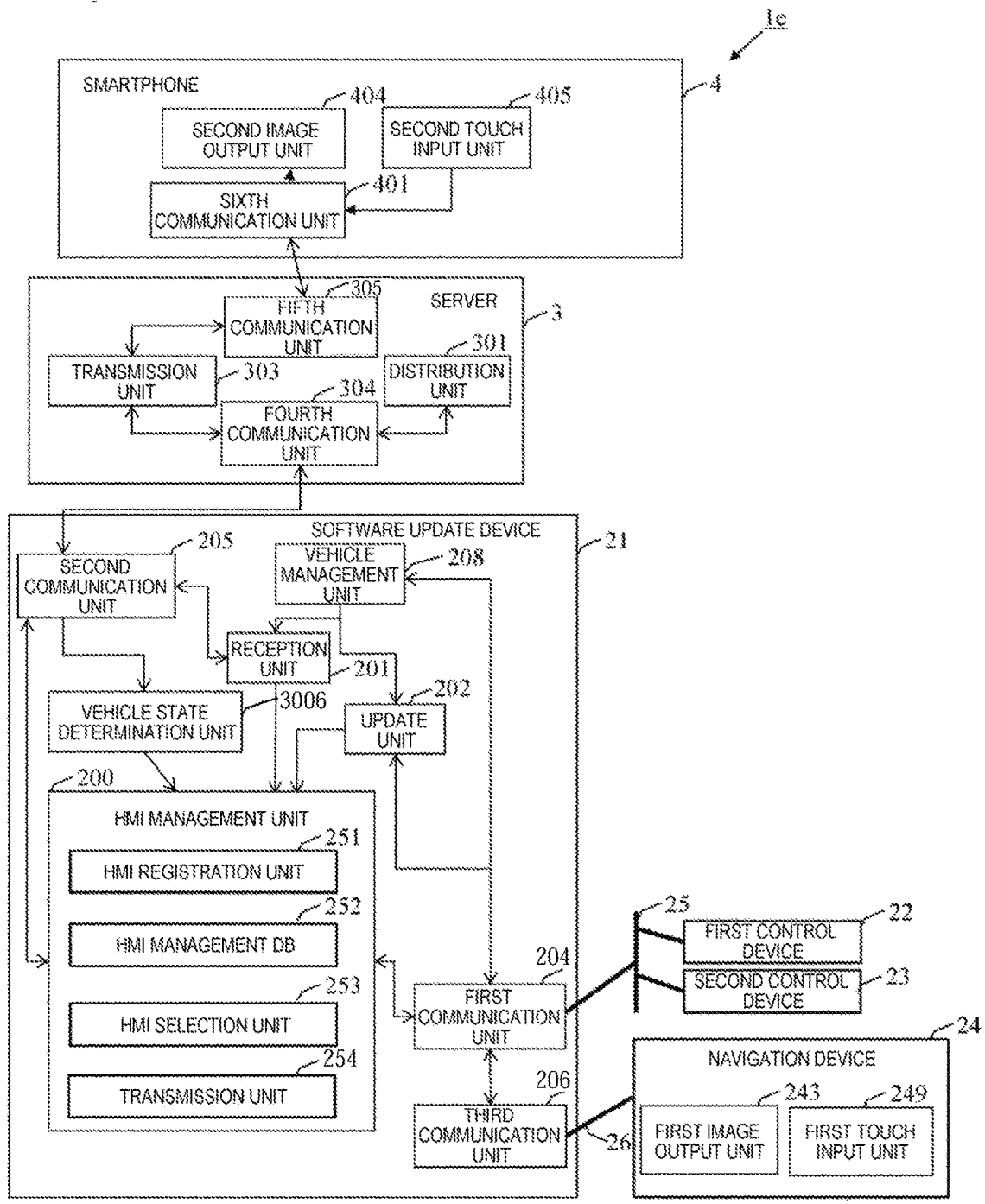

[FIG. 26]
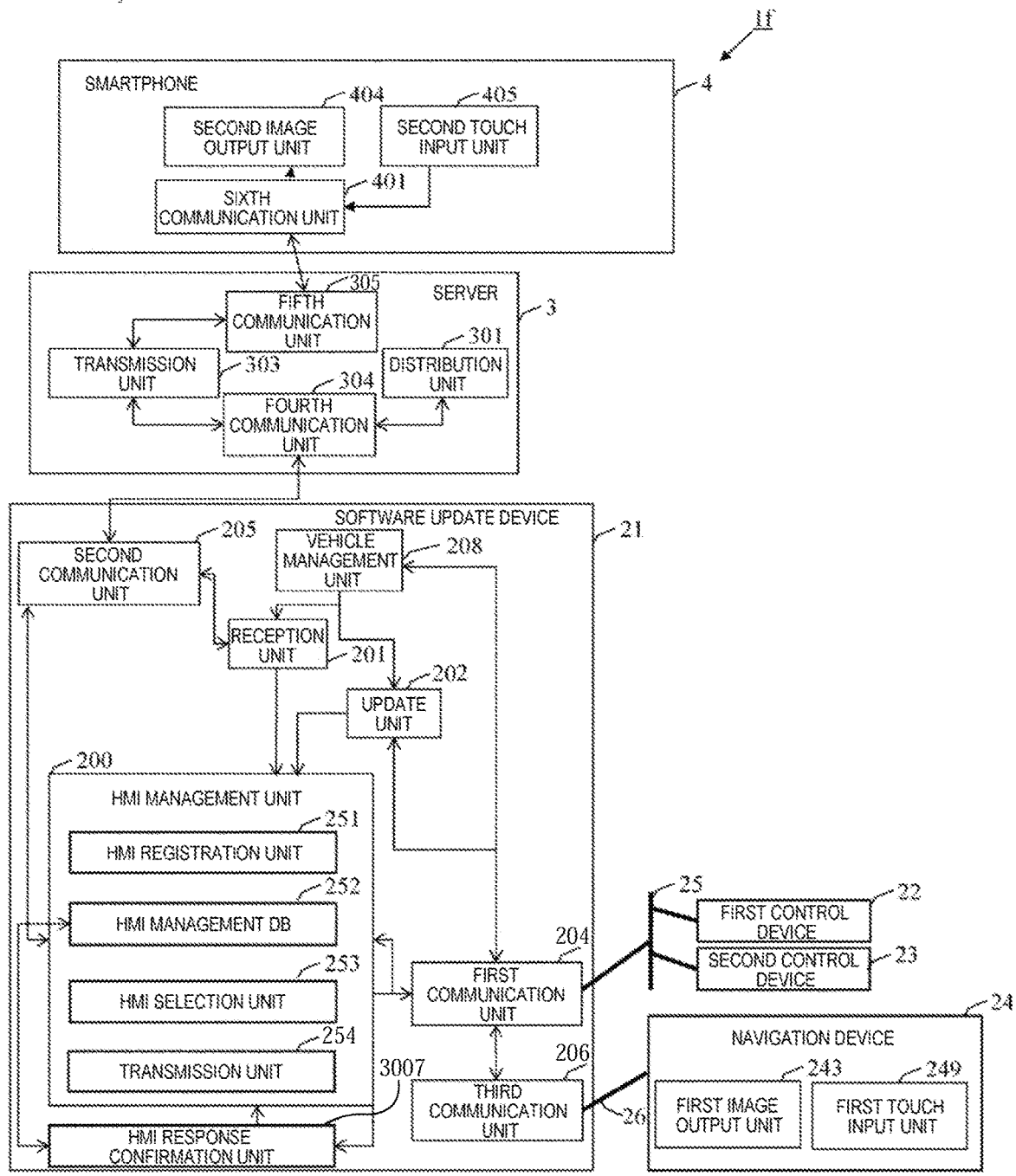

SOFTWARE UPDATE DEVICE AND SOFTWARE UPDATE SYSTEM

TECHNICAL FIELD

The present invention relates to a software update device and a software update system.

BACKGROUND ART

A portable radio communication device providing feedback in a text format to a user during its own software update process is known (for example, see PTL 1).

CITATION LIST

Patent Literature

PTL 1: JP-T-2008-508623

SUMMARY OF INVENTION

Technical Problem

In the related art, feedback by a device itself only, which is a software update target, is considered.

Solution to Problem

According to a first aspect of the present invention, a software update device includes: a memory unit for storing transmission destination information of a plurality of HMI devices each including a display device; a selection unit for selecting at least one HMI device among the plurality of HMI devices; an update unit for updating software of an in-vehicle device; and a transmission unit for getting the transmission destination information of the selected HMI device from the memory unit and sending a notification message regarding the update to the selected HMI device.

According to a second aspect of the present invention, a software update system includes: an in-vehicle device for executing certain software; a server including a distribution unit for distributing software of the in-vehicle device; a plurality of HMI devices each including a display device; and a software update device including a receiver unit for receiving the software from the server, a memory unit for storing transmission destination information of the plurality of HMI devices, a selection unit for selecting at least one HMI device among the plurality of HMI devices, an update unit for updating software of the in-vehicle device with the received software, and a transmission unit for getting the transmission destination information of the selected HMI device from the memory unit and sending a notification message regarding the update to the selected one HMI device.

Advantageous Effects of Invention

According to the present invention, a message related to update can be sent to an appropriate HMI device.

BRIEF DESCRIPTION OF DRAWINGS

FIG. 1 is a diagram schematically illustrating a configuration of a software update system.

FIG. 2 is a diagram schematically illustrating a hardware configuration of a software update device.

FIG. 3 is a diagram schematically illustrating a hardware configuration of a server.

FIG. 4 is a diagram schematically illustrating a hardware configuration of a smartphone 4.

FIG. 5 is a diagram schematically illustrating a hardware configuration of a first control device and a second control device.

FIG. 6 is a diagram schematically illustrating a hardware configuration of a navigation device.

FIG. 7 is a diagram schematically illustrating a software configuration of a software update system.

FIG. 8 is a diagram schematically illustrating a structure of a device management client tree DB.

FIG. 9 is a diagram schematically illustrating a structure of a device management server tree DB.

FIG. 10 is a diagram schematically illustrating a structure of a software update management DB.

FIG. 11 is a sequence diagram illustrating exchange of messages in a software update process.

FIG. 12 is an image displayed on a display unit of a navigation device.

FIG. 13 is a sequence diagram illustrating exchange of messages in a software update process.

FIG. 14 is an image displayed on a display unit of a smartphone.

FIG. 15 is a diagram schematically illustrating a structure of a package.

FIG. 16 is a sequence diagram illustrating an example of an operation of an update unit.

FIG. 17 is a sequence diagram illustrating an example of an operation of an update unit.

FIG. 18 is a diagram schematically illustrating a structure of an HMI management DB.

FIG. 19 is a flowchart illustrating an operation of an HMI selection unit.

FIG. 20 is a flowchart illustrating an operation of a transmission unit.

FIG. 21 is a diagram schematically illustrating a software configuration of a software update system.

FIG. 22 is a diagram schematically illustrating a software configuration of a software update system.

FIG. 23 is a diagram schematically illustrating a software configuration of a software update system.

FIG. 24 is a diagram schematically illustrating a software configuration of a software update system.

FIG. 25 is a diagram schematically illustrating a software configuration of a software update system.

FIG. 26 is a diagram schematically illustrating a software configuration of a software update system.

DESCRIPTION OF EMBODIMENTS

First Embodiment

FIG. 1 is a diagram schematically illustrating a configuration of a software update system according to a first embodiment. A software update system 1 includes a vehicle 2, a server 3, and a smartphone 4. The vehicle 2, the server 3, and the smartphone 4 are connected to each other via a network 5. Although FIG. 1 illustrates one vehicle 2 and one smartphone 4, the software update system 1 may include a plurality of vehicles 2 and smartphones 4.

A software update device 21, a first control device 22, a second control device 23, and a navigation device 24 are mounted on the vehicle 2. The software update device 21, the first control device 22, and the second control device 23 are connected to each other via a CAN network 25. The software update device 21 and the navigation device 24 are connected to each other via a USB network 26.

The software update device 21 updates software operating on the first control device 22, the second control device 23, and the navigation device 24 to new software distributed by the server 3. The first control device 22 and the second control device 23 are, for example, so-called ECUs (in-vehicle devices) of the vehicle 2, which control an engine or the like of the vehicle 2. The navigation device 24 is a device for guiding a user with a route from a departure point to a destination by, for example, a road map displayed on a screen, a voice, or the like.

The server 3 retains software operating on the vehicle 2 in an internal storage device. The server 3 performs data communication with the vehicle 2 and the smartphone 4 via the network 5 and distributes software to the vehicle 2. The smartphone 4 performs data communication with the vehicle 2 or the server 3 via the network 5 based on various types of information input by a user. Here the smartphone 4 may be another human machine interface (HMI) terminal such as a feature phone or a tablet terminal. The network 5 is, for example, an electric communication network such as the Internet.

FIG. 2 is a diagram schematically illustrating a hardware configuration of the software update device 21. The software update device 21 includes a memory unit 211, a control unit 212, a time management unit 213, a WAN I/F 214, a CAN I/F 215, a USB I/F 217, a BT (Bluetooth (Registered Trademark)) I/F 218, and a storage unit 219. The memory unit 211, the control unit 212, the time management unit 213, the WAN I/F 214, the CAN I/F 215, the USB I/F 217, the BT I/F 218, and the storage unit 219 are connected to each other via a bus 216.

The control unit 212 is a central processing unit (CPU) that controls input and output of information processed by the software update device 21 and operates according to the description of software stored in the memory unit 211. The memory unit 211 is a memory that temporarily stores information processed by the control unit 212 and exchanges data via the bus 216. The time management unit 213 manages time information for controlling an operation of the software update device 21. The storage unit 219 is a storage device that stores software of the software update device 21 and retains information stored in the memory unit 211 even when power is turned off. The storage unit 219 is, for example, a storage element such as a hard disk or SSD on which a file system is mounted, or a flash memory on which a file system is not mounted. The software update device 21 operates with software stored in the storage unit 219. By updating the software, it is possible to change an operation of the software update device 21.

The WAN I/F 214 is interface for sending or receiving information wirelessly. Wireless transmission or reception of information is performed in accordance with standards, for example, LTE, Wi-Fi, or the like. The CAN I/F 215 is a Controller Area Network (CAN) interface that is a dedicated network used in the vehicle 2. The CAN I/F 215 is connected to the CAN network 25 to communicate with other devices in the vehicle 2 (for example, the first control device 22 or the second control device 23). The USB I/F 217 is a USB standard interface and communicates with the navigation device 24 via the USB network 26.

FIG. 3 is a diagram schematically illustrating a hardware configuration of the server 3. The server 3 includes a memory unit 31, a control unit 32, a storage unit 34, and a WAN I/F 35. The memory unit 31, the control unit 32, the storage unit 34, and the WAN I/F 35 are connected to each other via a bus 36.

The control unit 32 is a central processing unit (CPU) that controls input and output of information processed by the server 3 and operates according to the description of software stored in the memory unit 31. The memory unit 31 is a memory that temporarily stores information processed by the control unit 32 and exchanges data via the bus 36. The storage unit 34 is a storage device that stores software of the software update device 21 and retains information stored in the memory unit 211 even when power is turned off. The storage unit 34 is, for example, a hard disk, SSD, a holographic disc, or the like on which a file system is mounted. The server 3 operates with software stored in the storage unit 34. The WAN I/F 35 is interface sending or receiving information wirelessly. Wireless transmission or reception of information is performed in accordance with standards, for example, LTE, Wi-Fi, or the like.

FIG. 4 is a diagram schematically illustrating a hardware configuration of the smartphone 4. The smartphone 4 includes a memory unit 41, a control unit 42, an input unit 43, a display unit 44, a storage unit 45, a WAN I/F 46, and a BT I/F 47. The memory unit 41, the control unit 42, the input unit 43, the display unit 44, the storage unit 45, the WAN I/F 46, and the BT I/F 47 are connected to each other via a bus 48.

The control unit 42 is a central processing unit (CPU) that controls input and output of information processed by the smartphone 4 and operates according to the description of software stored in the memory unit 41. The memory unit 41 is a memory that temporarily stores information processed by the control unit 42 and exchanges data via the bus 48. The input unit 43 is an input device for receiving an input from a user of the smartphone 4. The input unit 43 is, for example, an input device such as a touch pen or a finger contact type touch panel, a keyboard, or the like. The display unit 44 is a display device that displays information of the smartphone 4 to the user. The display unit 44 is a display device capable of displaying digital information, such as a liquid crystal panel, a touch panel, or the like. The storage unit 45 is a storage device that stores software of the smartphone 4 and retains information stored in the memory unit 41 even when power is turned off. The storage unit 45 is, for example, a storage element such as a hard disk or SSD on which a file system is mounted, or a flash memory on which a file system is not mounted. The smartphone 4 operates with software stored in the storage unit 45. By updating the software, it is possible to change an operation of the smartphone 4.

The WAN I/F 46 is interface for sending or receiving information wirelessly. Wireless transmission or reception of information is performed in accordance with standards, for example, LTE, Wi-Fi, or the like. The BT I/F 47 is interface for sending or receiving information wirelessly. In addition to sending or receiving information wirelessly, the BT I/F 47 may measure a distance with another BT I/F wirelessly.

FIG. 5 is a diagram schematically illustrating a hardware configuration of the first control device 22 and the second control device 23. Hereinafter, the first control device 22 is described. Also, since the second control device 23 has the same configuration as the first control device 22, descriptions thereof will be omitted.

The first controller 22 includes a memory unit 221, a control unit 222, a storage unit 223, and a CAN I/F 224. The memory unit 221, the control unit 222, the storage unit 223, and the CAN I/F 224 are connected to each other via a bus 225.

The control unit 222 is a central processing unit (CPU) that controls input and output of information processed by the first control device 22 and operates according to the description of software stored in the memory unit 221. The memory unit 221 is a memory that temporarily stores information processed by the control unit 222 and exchanges data via the bus 2025. The storage unit 223 is a storage device that stores software of the first control device 22 and retains information stored in the memory unit 221 even when power is turned off. The storage unit 223 is, for example, a storage element such as a hard disk or SSD on which a file system is mounted, or a flash memory on which a file system is not mounted. The first control device 22 operates with software stored in the storage unit 223. By updating the software, it is possible to change an operation of the software update device 21.

The CAN I/F 215 is a Controller Area Network (CAN) interface that is a dedicated network used in the vehicle 2, and is connected to the CAN network 25 to communicate with the software update device 21. It is possible to rewrite software stored in the storage unit 223 by receiving software by this interface. The control unit 222 is an ECU of a vehicle.

FIG. 6 is a diagram schematically illustrating a hardware configuration of the navigation device 24.

The navigation device 24 includes a memory unit 241, a control unit 242, an input unit 244, a display unit 245, a storage unit 246, and a USB I/F 247. The memory unit 241, the control unit 242, the input unit 244, the display unit 245, the storage unit 246, and the USB I/F 247 are connected to each other via a bus 248.

The control unit 242 is a central processing unit (CPU) that controls input and output of information processed by the navigation device 24 and operates according to the description of software stored in the memory unit 241. The memory unit 241 is a memory that temporarily stores information processed by the control unit 242 and exchanges data via the bus 248. The input unit 244 is an input device for receiving an input from a user of the navigation device 24. The input unit 244 is, for example, an input device such as a touch pen or a finger contact type touch panel, a keyboard, a commander, or the like. The display unit 245 is a display device that displays information of the navigation device 24 to the user. The display unit 245 is a display device capable of displaying digital information, such as a liquid crystal panel, a touch panel, or the like.

The storage unit 246 is a storage device that stores software of the navigation device 24 and retains information stored in the memory unit 241 even when power is turned off. The storage unit 246 is, for example, a storage element such as a hard disk or SSD on which a file system is mounted, or a flash memory on which a file system is not mounted. The navigation device 24 operates with software stored in the storage unit 246. By updating the software, it is possible to change an operation of the navigation device 24. The USB I/F 247 is interface for sending information by USB and communicates with the software update device 21.

FIG. 7 is a diagram schematically illustrating a software configuration of the software update system 1.

The smartphone 4 includes a second image output unit 404, a second touch input unit 405, and a sixth communication unit 401. The second image output unit 404 is a device for displaying an image, such as a liquid crystal, a cathode-ray tube, an electronic paper, or the like. The second touch input unit 405 is, for example, an input device for detecting a human contact, such as a touch panel or the like.

The server 3 includes a distribution unit 301, a transmission unit 303, a fourth communication unit 304, and a fifth communication unit 305. The distribution unit 301 distributes a package 80 stored in the storage unit 34 of the server 3 to the software update device 21 via the fourth communication unit 304 and the network 5. Here, the package 80 is software for another device such as the first control device 22, the navigation device 24, or the like.

The transmission unit 303 uses the fourth communication unit 304 and the fifth communication unit 305 to send various types of information output from the software update device 21, the first control device 22, the second control device 23, the navigation device 24, and the smartphone 4 to another device. Here, the various types of information are, for example, messages, images, contact information, and the like. The fourth communication unit 304 is interface to a wired or wireless communication network. The fourth communication unit 304 connects to the software update device 21 and performs communication. The fifth communication unit 305 is interface to a wired or wireless communication network. The fifth communication unit 305 connects to the smartphone 4 and performs communication.

The software update device 21 includes a receiver unit 201, an update unit 202, an HMI management unit 200, a vehicle management unit 208, a first communication unit 204, a second communication unit 205, and a third communication unit 206.

The receiver unit 201 receives the package 80 distributed by the distribution unit 301 via the second communication unit 205. The package 80 received by the receiver unit 201 is stored in the storage unit 219. The update unit 202 updates software of the navigation device 24 based on update information 83 included in the package 80.

The HMI management unit 200 determines to select an HMI device as triggered by software update. The HMI management unit 200 sends information, such as a message, an image, or the like, output by the software update device 21, the first control device 22, the second control device 23 and the navigation device 24 to the transmission unit 303 through the second communication unit 205. The HMI management unit 200 includes an HMI registration unit 251, an HMI management DB 252, an HMI selection unit 253, and a transmission unit 254. The components of the HMI management unit 200 will be described later in detail.

The vehicle management unit 208 gets vehicle information from the first control device 22 or the second control device via the first communication unit 204. The vehicle management unit 208 retains the got vehicle information and controls operations of the receiver unit 201, the update unit 202, and the HMI management unit 200 according to a state of the vehicle information. For example, the vehicle management unit 208 operates the receiver unit 201 to start downloading the package 80 in response to starting or igniting of an engine of the vehicle 2. For example, the vehicle management unit 208 operates the update unit 202 in response to turning off of ignition of the vehicle 2 to start updating software of the first control device 22, the second control device 23, and the navigation device 24.

The navigation device 24 includes a first image output unit 243 and a first touch input unit 249. The first image output unit 243 is a device for displaying an image, such as a liquid crystal, a cathode-ray tube, an electronic paper, or the like. The first touch input unit 249 is, for example, an input device for detecting a human touch, such as a touch panel, or the like.

The distribution unit 301 includes a device management server unit 61, a device management server tree DB (database) 62, a software update management DB 64, and a download server unit 63. The receiver unit 201 includes a device management client unit 71, a device management client tree DB 72, and a download client unit 73. An operation of downloading software to the vehicle 2 is realized by a function of each component constituting the distribution unit 301 and a function of each component constituting the receiver unit 201.

The device management server unit 61 exchanges a prescribed message with the device management client unit 71 and performs a certain procedure to implement a software update process between the server 3 and the vehicle 2. Specific interactions will be described in detail later. The device management server unit 61 is, for example, a Device Management (DM) server defined by Open Mobile Alliance (OMA). The device management client unit 71 is, for example, a DM client defined by OMA. Here, OMA DM is a technique used to update software of a mobile phone, wherein information necessary for software update is exchanged between a server and a client via access to a tree-like database called a tree DB. The device management server tree DB 62, the device management client tree DB 72, and the software update management DB 64 will be described later in detail.

The download server unit 63 provides the package 80 that is a group of information of software used for software update via the network 5. The download server unit 63 provides the package 80 by using a protocol, for example, HTTP, FTP, or the like. The download client unit 73 is a client connected to the download server unit 63 to receive the package 80 via the network 5.

The update unit 202 includes a sequence execution unit 76, an update information processing unit 77, and a protocol processing unit 78. These components will be described later together with a structure of the package 80.

FIG. 8 is a diagram schematically illustrating a structure of the device management client tree DB 72. The device management client tree DB 72 is a database for storing information according to a tree structure. The device management client tree DB 72 stores a plurality of elements constituting the tree structure. The plurality of elements include elements of a root element 101, a DevInfo element 102, a VIN1 element 103, a DevDetail element 104, a SCOMO element 105, a Download element 106, a Package3 element 107, a PkgURL element 108, a Status element 109, an Operation element 110, a Download element 111, an Inventory element 120, a Delivered element 121, a Package3 element 122, a Status element 123, an Operation elements 124, an Install element 125, a Deployed element 130, a first control device element 131, a Status element 132, a Version element 133, a second control device element 134, a Status element 135, a Version element 136, a navigation device elements 137, a Status element 138, and a Version element 139.

Feature information of a device, such as the VIN1 element 103, which is an identifier of a vehicle, is arranged under the DevInfo element 102. Attached information of the vehicle 2 is arranged under the DevDetail element 104. Elements used for software update are arranged under the SCOMO element 105.

Elements related to download are arranged under the Download element 106. In the example of FIG. 8, the Download element 106 and elements thereunder indicate to download software indicated by the Package3 element 122 from a URL indicated by the PkgURL element 108. The Status element 109 is an element for maintaining a state during download. When a server specifies the Download element 111 under the Operation element 110, a client can operate the download client unit 73 and the server can instruct to download the package 80.

Elements below the Package3 element 107 are all added to the device management client tree DB72 via the network 5 from the device management server unit 61. This additional sequence will be described later.

The Inventory element 120 is an element for expanding the downloaded package 80 to perform the software update process. Elements under the Delivered elements 121 store information of the package 80 got from the download server unit 63. The Package3 element 122 indicates a name of the downloaded package 80. The Status element 123 indicates a status during installation. When a server designates the Install element 125 under the Operation element 124, the update unit 202 of the client side is operated to start installation of software in a device specified in the package 80.

Elements under the Deployed element 130 store information of the installed software. The first control device element 131 indicates a name of the installed software. The Status element 132 indicates a status of an installation operation. The Version element 133 indicates a version number (for example, 1.0) of software retained in the first control device 22. Similarly, the second control device element 134 indicates a name of the installed software, the Status element 135 indicates a status of an installation operation, and the Version element 136 indicates a version number (for example, 1.1) of software retained in the second control device 23. Similarly, the navigation device element 137 indicates a name of the installed software, the Status element 138 indicates a status of an installation operation, and the Version element 139 indicates a version number (for example, 1.4) of software retained in the navigation device 24.

FIG. 9 is a diagram schematically illustrating a structure of the device management server tree DB 62. The device management server tree DB 62 is a database for storing information according to a tree structure. The device management server tree DB 62 retains information about the plurality of vehicles 2. The device management server tree DB 62 stores a plurality of elements constituting the tree structure. The plurality of elements include elements of a root element 150, a VIN1 element 151, a DevInfo element 154, a VIN1 element 180, a DevDetail element 155, a SCOMO element 156, another information element 158, a Download component 157, a Package1 element 159, a PkgURL element 160, a Status element 161, an Operation element 162, a Download element 163, a VIN2 element 152, a DevInfo element 164, a DEVDetail element 165, a SCOMO element 166, and another information element 167.

The VIN1 element 151 and the VIN2 element 152 indicate identifiers of vehicles 2 different from each other. Information below the root element 101 of the device management client tree DB 72 described with reference to FIG. 8 is stored under each of the VIN1 element 151 and the VIN2 element 152. In other words, the software update status of the vehicles 2 designated by VIN elements is configured to be stored in elements under all VIN elements. As such, since data is synchronously controlled between the device management client unit 71 and the device management server unit 61, the server 3 can grasp the software update status of the plurality of vehicles 2.

FIG. 10 is a diagram schematically illustrating a structure of the software update management DB 64. The software update management DB 64 is a database enabling a vendor of the vehicle 2 to set how to update software of the vehicle 2. The software update management DB 64 includes a plurality of records. Each record has items of Vehicle ID 181, ECU ID 182, Version 183, Package 184, and PkgURL 185.

The Vehicle ID 181 indicates an identifier of the vehicle 2 that is a software update target. The ECU ID 182 is an identifier indicating the first control device 22, the second control device 23, or the navigation device 24 of the vehicle 2 specified by the Vehicle ID 181. The Version 183 is a version number of update software to be applied to each device. For example, the first control device 22 is updated to software of a version 1.0, the second control unit 23 is updated to software of a version 1.1, and the navigation device 24 is updated to software of a version 1.5. The Package 184 indicates a name of the update destination package 80 when software is updated. The PkgURL 185 is URL information for determining how to download the package 80 from which server. In the examples of FIGS. 8 and 10, the Version 183 of the navigation device 24 is 1.5 whereas the Version 139 of the navigation device element 137 of the device management client tree DB 72 is 1.4. This indicates that software of the navigation device 24 needs to be updated from the version 1.4 to the version 1.5.

FIG. 11 is a sequence diagram illustrating exchange of messages in a software update process. When updating software, the device management client unit 71 sends VIN information to the device management server unit 61 (step 301) and refers to the vehicle ID 181 (FIG. 10) of the software update management DB 64. The VIN information is identification information of the vehicle 2. The device management server unit 61 stores the received VIN information in the VIN element 180 of the device management server tree DB 62.

Next, the device management server unit 61 sends a version information get request to the device management client unit 71 (step 302). The device management client unit 71 gets version information from the tree structure of the device management client tree DB 72 (step 351), and sends the version information to the device management server unit 61 (step 303). The version information here is software version information, such as the Version element 132, the Version element 136, the Version element 139, and the like under the Deployed element 130. The device management server unit 61 compares the received version information and the version information of the software update management DB 64 to determine a device for updating software (step 352).

Next, the device management server unit 61 sends software update information to the device management client unit 71 (step 304). Specifically, the software update information refers to the entire tree structure in and under the Download element 157 in FIG. 9 and includes information such as the PkgURL element 160 indicating where to download the package 80 from. The Package3 element 159 or the PkgURL element 160 is information pre-got from the Package element 184 and the PkgURL element 185 of the software update management DB 64. The device management client unit 71 adds the received software update information to the device management client tree DB 72 (step 353). Specifically, the received software update information is added under the SCOMO element 205 under the device management server tree DB 62 of FIG. 9 as the Download element 106. Thereafter, the device management client unit 71 sends a response to the device management server unit 61 (step 305).

The device management server unit 61 sends a software update permission request message A to the device management client unit 71 (step 306) so as to inquire the user whether to update software. The device management client unit 71 sends an input request to the HMI management unit 200 (step 354). HMI management unit 200 displays a message on a currently selected HMI device (for example, the navigation device 24) and receives a response of the user from the first touch input unit 249. An image displayed on the display unit 245 of the navigation device 24 at this time is illustrated in FIG. 12 as an example. The HMI management unit 200 sends the response to the device management client unit 71 (step 355). The device management client unit 71 sends information indicating permission or non-permission to the device management server unit 61 (step 307).

In order to cause the software update device 21 to download the package 80, the device management server unit 61 sends a download execution instruction to the device management client unit 71 (step 308). The device management client unit 71 sets that the device management client tree DB 72 is being updated (step 361), and instructs the download client unit 73 to execute download (step 356). At this time, a download destination URL is the PkgURL element 160 included in the software update information set in step 353. The device management client 71 simultaneously notifies the device management server unit 61 that the update is being performed (step 364). The device management server unit 61 sets that the device management server tree DB 62 is being updated (step 359).

The download client unit 73 designates the download destination URL, requests the download server unit 63 for the package 80 (step 309), and downloads the package 80 (step 310). The download client unit 73 notifies the device management client unit 71 that the download is completed (step 357). The device management client unit 71 sends to the device management server unit 61 that download has completed (step 311). Further, a download status (in this case, successful ending of the download) is set to the Status element 109 of the device management client tree DB 72 (step 358). The device management server unit 61 sets the completion of the downloading to the device management server tree DB 62 (step 360).

FIG. 13 is a sequence diagram illustrating exchange of messages in the software update process continued from FIG. 11. The device management server unit 61 sends a software update permission request message B to the device management client unit 71 for the user to confirm whether to surely update the software (step 312). The device management client unit 71 sends an input request to the HMI management unit 200 (step 359). The HMI management unit 200 displays a message on the currently selected HMI device (for example, the navigation device 24) and receives a response of the user from the first touch input unit 249. HMI management unit 200 returns the response to the device management client unit 71 (step 360). The device management client unit 71 sends information indicating permission or non-permission to the device management server unit 61 (step 313).

The device management server unit 61 sends a message instructing execution of software update to the device management client unit 71 (step 314). The device management client unit 71 updates a Status element (for example, the Status element 138) of the device management client tree DB 72 (step 363). The device management client unit 71 sends an update start message to the update unit 202 to execute a software update process 390 described later (step 317). At the same time, the device management client unit 71 sends a notification that update is started to the device management server unit 61 (step 366). Here, the start of software update is notified to the HMI management unit 200 during the software update process 390, and such a process will be described later with reference to FIGS. 17 and 18. At this time, an HMI device on which the message is displayed is changed from the navigation device 24 to the smartphone 4.

The device management server unit 61 updates a Status element (for example, the Status element 138) of the device management server tree DB 62 (step 359). When the software update process 390 ends, the device management client unit 71 notifies the device management server unit 61 that the software update is completed (step 315), and sets a Status element (for example, the Status element 138) of the device management client tree DB 72 (Step 361). The device management server unit 61 updates a Status element (for example, the Status element 138) of the device management server tree DB 62 in order to retain the fact of the completion of the software update (step 362). The device management server unit 61 sends a message for notifying the user that the software update is completed to the device management client unit 71 (step 316). The device management client unit 71 sends a completion notification to the HMI management unit 200 (step 363) to notify the user that the software update is ended. An image displayed at this time on the display unit 44 of the smartphone 4 is illustrated in FIG. 14 as an example. Through the flow of the above processes, the exchange of messages of the software update process is completed.

FIG. 15 is a diagram schematically illustrating a structure of the package 80. When software is updated, the package 80 is transmitted from the download server unit 63 to the download client unit 73.

The package 80 includes a header unit 81, sequence information 82, and the update information 83. The header unit 81 is information for describing how the sequence information 82 and the update information 83, which will be described later, are stored in a package. The header unit 81, for example, includes information such as the size of the sequence information 82 and the size of the update information 83. Further, the header unit 81 may include VIN information for identifying the vehicle 2, information indicating compression formats of the sequence information 82 and the update information 83, key information for decoding the sequence information 82 and the update information 83, and the like.

The sequence information 82 is a script describing an operation of the update unit 202. This script describes the execution sequence and the determination sequence of processes in the update unit 202 illustrated in FIGS. 16 and 17, as a program. The sequence information 82 is described by, for example, a program language such as JavaScript or Ruby, a job control language such as a shell or a batch, OTX (Open Text sequence eXchange format) defined in ISO 13209, or the like. In the following description, it is assumed that the sequence information 82 is described by OTX.

The update information 83 includes binary code information of software operating the first control device 22, the second control device 23 and the navigation device 24, procedure information used for software update, and diagnosis information of the vehicle 2, and the like. The update information 83 is expressed by, for example, ODX (Open Diagnostics data eXchange) defined in ISO 22901. The procedure information includes, for example, version information of software or the like.

A relationship between components of the update unit 202 illustrated in FIG. 7 and the package 80 will be described. The update unit 202 includes the sequence execution unit 76, the update information processing unit 77, and the protocol processing unit 78. The sequence execution unit 76 interprets the sequence information 82 and executes a script as an interpreter. The update information processing unit 77 sends a binary code created from the update information 83 to a device that is a software update target. The protocol processing unit 78 executes a procedure for storing the binary code sent to the device by the update information processing unit 77 in the storage unit of the device.

FIG. 16 is a sequence diagram illustrating an example of an operation of the update unit 202. As described above, the operation of the update unit 202 changes according to the contents of the sequence information 82 illustrated in FIG. 15. In the following description, a sequence for updating software of the first control device 22 will be described.

The device management server unit 61 sends a message instructing execution of software update to the device management client unit 71 (step 314). The device management client unit 71 instructs the sequence execution unit 76 of the update unit 202 to start an update process (step 400). The sequence execution unit 76 notifies the update information processing unit 77 of start of update (step X1), and then reads and interprets the sequence information 82 as a program (step 274) to execute the sequence information 82 as a sequence. The update information processing unit 77 reads the VIN information of the vehicle 2 included in the header unit 81 of the package (step X2) and sends the VIN information to the sequence execution unit 76 (step X3). The sequence execution unit 76 determines whether the VIN information received in step X3 matches the VIN1 got in step 301 (step 401), and if not match, the sequence execution unit 76 stops the update (step 402), and sends a message indicating abnormality to the HMI management unit 200 (step 412). On the other hand, if the VIN information received in step X3 matches the VIN1 got in step 301, the sequence execution unit 76 communicates with the first control device 22 to request a version (step 404) and gets the version (step 405). The update information processing unit reads the version information included in the update information 83 of the package 80 (step X4), and sends the version information to the sequence execution unit 76 (step X5). The sequence execution unit 76 determines whether the version information received in step X5 matches the version got in step 405 (step 405), and if not match, the sequence execution unit 76 stops the update (step 407) and sends a message indicating abnormality to the HMI management unit 200 (step 412). On the other hand, if the version information received in step X5 matches the version got in step 405, the sequence execution unit 76 requests the vehicle management unit 208 for the vehicle information (step 408) and gets various types of information from the vehicle 2 (step 409). The various types of information stated here are, for example, information indicating a state of ignition and a state of engine. The vehicle management unit 208 retains the above-described vehicle information got by communicating with the first control device 22, the second control device 23, and the like.

The sequence execution unit 76 checks the vehicle information got in step 409 (step 410), stops the update if there is a problem with the software update (step 411) and sends a message indicating abnormality to the HMI management unit 200 (step 412). On the other hand, if there is no problem, the sequence execution unit 76 communicates with the first control device 22 to request DTC information (step 413) and gets the DTC information. The DTC information is a type of diagnosis information of the vehicle 2, and the abbreviation of a Diagnostic Table Code. By examining the DTC information, existence of any abnormality in the vehicle 2 can be investigated. The sequence execution unit 76 examines the DTC information (step 415), and when there is a problem (step 416), the sequence execution unit 76 sends the problem to the HMI management unit 200 to display the abnormality (step 417). Upon receiving the abnormality display 412 and the abnormality display 417, the device management client unit 71 sends a response to abnormal ending to the device management server unit 61 (step 418).

If there is no abnormality in step 415, the update unit 202 executes an authentication process to update software of the first control device 22. In the authentication process, the sequence execution unit 76 sends an authentication request to the first control device 22 (step 419) and receives challenge information as a response (step 420). The sequence execution unit 76 generates response information from the challenge information according to a determined method (step 421) and sends the response information to the first control device 22. The sequence execution unit 76 receives the authentication information from the first control device 22 (step 423), and if authentication fails (step 424), the device management client unit 71 sends the authentication failure to the HMI management unit 200 to display the abnormality (step 425). At the same time, the device management client unit 71 sends a response indicating that the authentication has failed to the device management server unit 61 (step 426).

FIG. 17 is a sequence diagram illustrating an example of the operation of the update unit 202 continued from FIG. 16. If the authentication succeeds, the sequence execution unit 76 instructs the update information processing unit 77 to update software based on the package 80 (step X7). The update information processing unit 77 determines whether the first control device 22 is configured to evacuate a unique learning value retained by the first control device 22 (step 430), and if the learning value is not evacuated, the update information processing unit 77 stops the update (step 431) and the device management client unit 71 sends the abnormality to the HMI management unit 200 to display the abnormality (step 432). At the same time, the device management client unit 71 sends a response indicating that the learning value is not evacuated to the device management server unit 61 (step 433). The update information processing unit 77 communicates with the first control unit 22 to request the learning value (step 434), gets the learning value (step 435), and stores the got learning value in the storage unit 219 (step 436).

The update information processing unit 77 requests to delete a block to update software of the first control device 22 (step 437) and requests writing of the binary code included in the update information 83 of the package 80 (step 438). When software is updated a plurality of times or software of another block is to be updated (step 439), the process returns to step 437.

Upon completion of the update process, the update information processing unit 77 sends a learning value write request to write back the learning value retained in step 436 to the first control device 22 (step 442). The update information processing unit 77 requests the first control device 22 to reset (step 440) and notifies the device management client unit 71 that the software update is completed (step 441). The device management client unit 71 notifies the device management server unit 61 that the software update is completed (step 315). The device management server unit 61 sends an instruction to the device management client unit 71 to display a message indicating that the software update is completed (step 316), and the device management client unit 71 sends the message to the HMI management unit 200 to display the message (step 363). By the above operation, the software update of the first control device 22 is executed.

A device that is a software update target is not limited to the first control device 22, and may be the second control device 23 or the navigation device 24. In this case, the first control device 22 in the above description may be replaced with each of the second control device 23 or the navigation device 24.

The HMI management unit 200 will be described with reference to FIG. 7. The HMI management unit 200 includes the HMI registration unit 251, the HMI management DB 252, the HMI selection unit 253, and the transmission unit 254.

The HMI registration unit 251 has a function of registering various types of information of an HMI device connected to the software update system. 1 in the HMI management DB 252 described later. The HMI device connected to the software update system 1 includes, for example, a device such as the navigation device 24 installed in the vehicle 2 and connected to the software update device 21 via the USB network 17, or a device such as the smartphone 4 communicating with the software update device 21 of the vehicle 2 via the network 5.

A registration method includes, for example, a method using a user interface implemented by using the first image output unit 243 and the first touch input unit 249 of the navigation device 24, and a method triggered by connection of the smartphone 4 to the vehicle 2 through the network 5. In the former method, for example, a list of HMI devices to be registered is displayed on a screen of the first image output unit 243, the first touch input unit 249 receives a user input to select an HMI device, and the selected HMI device is registered in the HMI management DB 252. In the latter method, for example, when the smartphone 4 is connected to the vehicle 2, the smartphone 4 sends its own various types of information to the HMI management unit 200, and the HMI registration unit 251 registers the smartphone 4 in the HMI management DB 252 as the HMI device.

The HMI management DB 252 is a database for managing information of an HMI device collected by the HMI registration unit 251. Details about the HMI management DB 252 will be described later. The HMI selection unit 253 selects one HMI device based on the information of HMI devices retained in the HMI management DB 252 as triggered by software update or the like, and sets the HMI device as a transmission destination to the transmission unit 254. For example, the IP address of the HMI device got in step 492 is set in the HMI selection unit 253. The transmission unit 254 sends the information received by the HMI management unit 200 to the HMI device selected by the HMI selection unit 253. The information received by the HMI management unit 200 is, for example, a message or image output by the software update device 21, the first control device 22, the second control device 23, the navigation device 24, or the like. For example, the transmission unit 254 sends a message or image to the transmission unit 303 of the server 3 via the second communication unit 205 or to the navigation device 24 via the third communication unit 206.

FIG. 18 is a diagram schematically illustrating a structure of the HMI management DB 252. The HMI management DB 252 is a database including zero or more records. One record indicates information of one HMI device. That is, one record corresponds to one HMI device. Each record includes a device type 520, a destination address 530, an input device flag 540, an in-use flag 550, and an out-of-vehicle flag 560.

The device type 520 is information uniquely indicating what an HMI device is. The device type 520 is, for example, information indicating IVI (a navigation device or a smartphone), a head-mounted display (HMD), a head-up display (HUD), or the like. The destination address 530 is destination information indicating where to send information so as to display the information on the HMI device. The destination address 530 is, for example, an IP address or a MAC address. By sending information to a destination indicated by the destination address 530, the information is displayed on the corresponding HMI device.

The input device flag 540 is a flag indicating whether an HMI device is an input device or has a function of an input device. The in-use flag 550 is a flag indicating whether the HMI device is currently in use. The out-of-vehicle flag 560 is a flag indicating whether the HMI device is a device outside a vehicle or inside the vehicle.

In the example of FIG. 18, three HMI devices are registered in the HMI management DB 252. The first HMI device is IVI 521, a destination address 531 is an IP address "192.168.0.5", an input device flag 541 is "0" indicating an input device, an in-use flag 551 is "X" indicating not in use, and an out-of-vehicle flag 561 is "X" indicating inside a vehicle. The second HMI device is a smartphone 522, a destination address 532 is an IP address "192.168.1.5", an input device flag 542 is "0" indicating an input device, an in-use flag 551 is "0" indicating in use, and an out-of-vehicle flag 563 is "0" indicating outside a vehicle. The third HMI device is an HMD 523, a destination address 533 is an IP address "192.168.2.5", an input device flag 543 is "X" indicating not an input device, an in-use flag 551 is "X" indicating not in use, and an out-of-vehicle flag 563 is "X" indicating inside a vehicle.

Corresponding to a plurality of HMI devices, an operation for implementing a mechanism for displaying a message output during software update by sending the message to an appropriate HMI device will be described with reference to FIG. 7.

The sixth communication unit 401 of the smartphone 4 sends the above-described device type 420, the destination address 430, and the input device flag 440 to the HMI registration unit 251 of the HMI management unit 200 via the second communication unit 205. The HMI registration unit 251 generates records from the received device type 520, destination address 530, and input device flag 540, and registers the records in the HMI management DB 252. Similarly, the navigation device 24 sends the device type 420, the destination address 430, and the input device flag 440 to the HMI registration unit 251 of the software update device 21 via the third communication unit 206. The HMI registration unit 251 generates records from the received device type 520, destination address 530, and input device flag 540, and registers the records in the HMI management DB 252. Through the above operation, the plurality of HMI devices can be registered in the software update system 1.

The server 3 communicates between the distribution unit 301 and the receiver unit 201 via the fourth communication unit 304, and distributes the package 80. The update unit 202 of the software update device 21 reads the package 80 and updates software of the first control device 22, the second control device 23, and the navigation device 24 via the first communication unit 204. In this case, the update unit 202 sends a message about update of the software to the HMI selection unit 253 of the HMI management unit 200. The HMI selection unit 253, in response, selects an appropriate record among the records registered in the HMI management DB 252 and gets the destination address 530 from the selected records. The HMI selection unit 253 sets the got destination address 530 in the transmission unit 254. The transmission unit 254 performs a sending process by sending information such as a message, an image, or the like, received by the HMI management unit 200 to the destination address 530.

Data sent by the HMI management unit 200 in each sequence of FIGS. 11, 13, 16, and 17, specifically, the input request 354 and the response 355 of FIG. 11, the input request 359, the response 360, and the completion notification 363 of FIG. 13, the abnormality display 412, the abnormality display 417, and the abnormality display 425 of FIG. 16, and the abnormality display 432 and the completion notification 363 of FIG. 17 is sent by the transmission unit 254 to the destination address 430 which is selected by the HMI management unit 200.

FIG. 19 is a flowchart illustrating an operation of the HMI selection unit 253 selecting an appropriate record among the records registered in the HMI management DB 252. The HMI selection unit 253 determines whether it is necessary to switch the HMI device (step 1007). For example, when it is necessary to switch the HMI device due to software update or the like, an IP address of the HMI device that needs to be switched is got (step 1008). In the current embodiment, the IP address can be got from the update unit 202. The HMI selection unit 253 searches the records of the HMI management DB 252 to retrieve a record that matches the IP address (step 1009). When the in-use flag 550 of the record is "X", that is, when the HMI device is not in use, the HMI selection unit 253 proceeds to step 1000. On the other hand, when the in-use flag 550 of the record is "0", that is, when the HMI device is in use, the in-use flag 550 is temporarily set to "Δ" (step 1011) and marking is performed.

The HMI selection unit 253 searches the records of the HMI management DB 252 to select a record whose in-use flag 550 is "X" (step 1012). When a plurality of records whose in-use flag 550 is "X" are found, the HMI selection unit 253 further examines the input device flag 540 and selects a record whose input device flag 540 is "0" (step 1012). The HMI selection unit 253 changes the in-use flag 550 of the selected record to "0" (step 1013), and gets the destination address 530 from the selected record (step 1014). The HMI selection unit 253 sets the got destination address 530 in the transmission unit 254 (step 1015). The HMI selection unit 253 searches for a record whose the in-use flag 550 is "Δ" (step 1016), changes the in-use flag 550 of the record to "0", and proceeds to step 1000.

FIG. 20 is a flowchart illustrating an operation of the transmission unit 254. The transmission unit 254 determines whether the HMI selection unit 253 instructed that the HMI device needs to be switched (step 2001). For example, it is instructed that the HMI device needs to be switched due to software update or the like. When it is not instructed that the HMI device needs to be switched, the transmission unit 254 executes step 2004. When the HMI device needs to be switched, the transmission unit 254 gets an IP address of an HMI device that needs to be switched (step 2002). Next, the transmission unit 254 stores the IP address in a memory of the memory unit 211 (step 2003).

The transmission unit 254 determines whether a message or an image is sent to the HMI management unit 200 (step 2004), and if not sent, performs step 2001. If the message or the image is sent, this message is received (step 2005) and the IP address of the destination stored in step 2003 is set to the second communication unit 205 or the third communication unit 206 (step 2006). The transmission unit 254 sets an arrived message to the second communication unit 205 or the third communication unit 206, and transmits the message. Thereafter, the transmission unit 254 executes step 2001.

By such an operation, the message output during software update is sent to an appropriate HMI device and displayed by the HMI device.

According to the above embodiments, following operational effects are got.

(1) The HMI selection unit 253 selects one HMI device from a plurality of HMI devices. The transmission unit 254 sends a message or an image related to software update sent to the HMI management unit 200 to the HMI device selected by the HMI selection unit 253. Accordingly, a message related to update can be sent to an HMI device.

(2) The HMI selection unit 253 selects one HMI device from a plurality of HMI devices when it is necessary to switch an HMI device due to, for example, software update or the like. Accordingly, it is possible to always select an appropriate HMI device for sending a message related to update.

(3) The transmission unit 254 sends DTC information that is a type of diagnosis information of the vehicle 1 to an HMI device selected by the HMI selection unit 253. Accordingly, a state of the vehicle 2 can be surely notified to a user.

(4) The transmission unit 254 determines whether it is necessary to switch an HMI device from the HMI selection unit 253, and when it is necessary to switch an HMI device due to, for example, software update or the like, the HMI selection unit 253 selects one HMI device from a plurality of HMI devices. In other words, when software of any one of the plurality of HMI devices is updated, the HMI selection unit 253 selects an HMI device different from the HMI device to be updated. Accordingly, an HMI device can be switched at the timing of software update, and a message generated by a software update system can be displayed on an appropriate HMI device.

Second Embodiment

FIG. 21 is a diagram schematically illustrating a software configuration of a software update system 1a according to a second embodiment. The software update system 1a has a similar configuration as the software update system 1 according to the first embodiment of FIG. 7, but the software update device 21 further includes a contact conformation unit 3001.

The contact confirmation unit 3001 detects a touch of a user on the second touch input unit 405 of the smartphone 4. In other words, the contact confirmation unit 3001 detects a change of input information of the second touch input unit 405. Upon detecting the touch of the user on the smartphone 4, the contact confirmation unit 3001 notifies the HMI management unit 200 of the IP address of the smartphone. Affirmative determination is made in step 1007 of FIG. 19 according to this notification, and the HMI selection unit 253 starts an operation of selecting a new HMI device.

By the above operation, it is possible to realize a mechanism for switching an HMI device to be used by the user in response to the touch of the user.

According to the above-described embodiment, in addition to the same operational effects as the first embodiment, following operational effects can be further got.

(1) The HMI selection unit 253 selects one HMI device detected by the contact confirmation unit 3001 to have been touched by the user among the plurality of HMI devices. Accordingly, a message during software update can be displayed on an HMI device that is being touched by the user, that is, in use.

Third Embodiment

FIG. 22 is a diagram schematically illustrating a software configuration of a software update system 1b according to a third embodiment. The software update system 1b has a similar configuration as the software update system 1 according to the first embodiment of FIG. 7, but the smartphone 4 further includes an HMI setting unit 3002.

The HMI setting unit 3002 sets an HMI device to be used by using the second image output unit 404 and the second touch input unit 405. The HMI setting unit 3002 provides interface for setting an HMI device to be used to a user through a graphical user interface (GUI) realized by the second image output unit 404 and the second touch input unit 405. For example, the HMI setting unit 3002 displays a list of available HMI devices on the second image output unit 404. When the user selects (designates) a certain HMI device by the second touch input unit 405, the HMI setting unit 3002 notifies the HMI management unit 200 of the software update device 21 of the IP address of the selected (designated) HMI device. Affirmative determination is made in step 1007 of FIG. 19 by this notification, and the HMI selection unit 253 starts an operation of selecting a new HMI device.

By the above operation, it is possible to realize a mechanism for switching an HMI device to be used by the user when the user explicitly selects the HMI device by using a GUI.

According to the above-described embodiment, in addition to the same operational effects as the first embodiment, following operational effects can be further got.

(1) The HMI selection unit 253 selects one HMI device designated by the user from a plurality of HMI devices. Accordingly, a message during software update can be displayed on the HMI device designated by the user.

Fourth Embodiment

FIG. 23 is a diagram schematically illustrating a software configuration of a software update system 1c according to a fourth embodiment. The software update system 1c has a similar configuration as the software update system 1 according to the first embodiment of FIG. 7, but the software update device 21 further includes an HMI survival confirmation unit 3003.

The HMI survival confirmation unit 3003 detects an HMI device capable of displaying a current message. The HMI survival confirmation unit 3003 inquires all HMI devices connected to the software update system 1c whether the current message is displayable. The HMI survival confirmation unit 3003 examines the HMI management DB 252 of the HMI management unit 200 when detecting an HMI device unable to display, and detects a currently available HMI device. The HMI survival confirmation unit 3003 notifies the HMI management unit 200 of the IP address of the currently available HMI device. Accordingly, affirmative determination is made in step 1007 of FIG. 19, and the HMI selection unit 253 starts an operation of selecting a new HMI device.

By the above operation, it is possible to realize a mechanism for switching an HMI device to be used by the user when it is detected that an HMI device is not available due to the reason, for example, that software is being updated or the HMI device is being used by the user.

According to the above-described embodiment, in addition to the same operational effects as the first embodiment, following operational effects can be further got.

(1) When software of an HMI device is being updated, the HMI selection unit 253 selects another HMI device. Accordingly, the user can reliably select an available HMI device only.

(2) The HMI selection unit 253 selects one HMI device detected to be available by the HMI survival confirmation unit 3003 among a plurality of HMI devices. Accordingly, a message during software update can be displayed on a currently available HMI device without having to explicitly notify unavailability to an HMI device.

Fifth Embodiment

FIG. 24 is a diagram schematically illustrating a software configuration of a software update system 1*d* according to a fifth embodiment. The software update system 1*d* has a similar configuration as the software update system 1 according to the first embodiment of FIG. 7, but the smartphone 4 further includes a distance measurement unit 3004. Also, the software update device 21 further includes a distance determination unit 3005.

The distance measurement unit 3004 measures a distance between the smartphone 4 and the vehicle 2. For example, the distance measurement unit 3004 always (or intermittently) performs radio communication with the vehicle 2, and measures the distance between the smartphone 4 and the vehicle 2 based on radio wave intensity.

The distance determination unit 3005 detects that the distance measured by the distance measurement unit 3004 is equal to or greater than a certain distance. In other words, the distance determination unit 3005 detects that the user holding the smartphone 4 is separated from the vehicle 2 by more than a certain distance. The distance determination unit 3005 notifies the HMI management unit 200 of the IP address of the smartphone when detecting that the distance between the smartphone 4 and the vehicle 2 is equal to or greater than the certain distance. Accordingly, affirmative determination is made in step 1007 of FIG. 19, and the HMI selection unit 253 starts an operation of selecting a new HMI device.

By the above operation, it is possible to realize a mechanism for switching an HMI device to be used by the user when the user is separated from the vehicle 2 by a certain distance.

The distance measurement by the distance measurement unit 3004 may be performed by a method different from the method using the radio wave intensity of the radio communication described above. The distance measurement by the distance measurement unit 3004 may be performed with such accuracy as to determine whether the distance between the smartphone 4 and the vehicle 2 is equal to or greater than a predetermined distance.

According to the above-described embodiment, in addition to the same operational effects as the first embodiment, following operational effects can be further got.

(1) The HMI selection unit 253 selects an HMI device different from the HMI device detected by the distance determination unit 3005 to be separated from the vehicle 2 by a certain distance or grater. Accordingly, it is possible to display a notification message related to software update on an HMI device that the user can reliably use. For example a message can be displayed on the navigation device 24 when the user is in the vehicle, and on the smartphone 4 when the user 2 is away from the vehicle 2.

Sixth Embodiment

FIG. 25 is a diagram schematically illustrating a software configuration of a software update system 1*e* according to a sixth embodiment. The software update system 1*e* has a similar configuration as the software update system 1 according to the first embodiment of FIG. 7, but the software update device 21 further includes a vehicle state determination unit 3006.

The vehicle state determination unit 3006 gets a vehicle state from the vehicle management unit 208 and detects whether the engine of the vehicle 2 is started. When detecting a change in the vehicle state, the vehicle state determination unit 3006 examines the HMI management DB 252 of the HMI management unit 200 and notifies the HMI management unit 200 of the IP address of a new HMI device. Accordingly, affirmative determination is made in step 1007 of FIG. 19, and the HMI selection unit 253 starts an operation of selecting a new HMI device.

By the above operation, it is possible to realize a mechanism for switching an HMI device to be used by the user when the vehicle state changes.

The vehicle state determination unit 3006 may detect whether ignition is on or off, for example, instead of whether the engine of the vehicle 2 is started.

According to the above-described embodiment, in addition to the same operational effects as the first embodiment, following operational effects can be further got.

(1) The HMI selection unit 253 selects one HMI device when a change of a vehicle state is detected by the vehicle state determination unit 3006. Accordingly, an HMI device to be used by the user can be switched based on the change of the vehicle state. For example, a message can be displayed on the navigation device 24 when the power of the vehicle 24 is on and on the smartphone 4 when the power of the vehicle 24 is off.

Seventh Embodiment

FIG. 26 is a diagram schematically illustrating a software configuration of a software update system 1*f* according to a seventh embodiment. The software update system if has a similar configuration as the software update system 1 according to the first embodiment of FIG. 7, but the software update device 21 further includes an HMI response confirmation unit 3007.

The HMI response confirmation unit 3007 detects whether a response to a message sent to an HMI device by the transmission unit 254 of the HMI management unit 200 is returned within a certain time. The HMI response confirmation unit 3007 examines the HMI management DB 252 of the HMI management unit 200 to detect a currently available HMI device when a response to the message sent to the HMI device is not returned within the certain time. The HMI response confirmation unit 3007 notifies the HMI management unit 200 of the IP address of the available HMI device. Accordingly, affirmative determination is made in step 1007 of FIG. 19, and the HMI selection unit 253 starts an operation of selecting a new HMI device.

The transmission unit 254 has a function of retaining a latest message sent to an HMI device. When the HMI selection unit 253 selects a new HMI device, a transmission unit 254 sends the retained latest message to the new HMI device. The HMI response confirmation unit 3007 uses the time management unit 213 as a timer to detect that there is no response for the certain time.

By the above operation, it is possible to realize a mechanism for switching an HMI device to be used by the user when a message is sent to the HMI device and the user does not return a response to the message within a certain time, and resending the message to the changed HMI device.

According to the above-described embodiment, in addition to the same operational effects as the first embodiment, following operational effects can be further got.

(1) The HMI selection unit 253 selects another HMI device when a response is not confirmed within a certain time after a notification message is sent to an HMI device by the transmission unit 254, and the transmission unit 254 sends the notification message again to the another selected HMI device. Accordingly, when an HMI device displays a message but a user does not respond for a certain time, the same notification message can be displayed again on another HMI device.

While various embodiments and modifications have been described above, the present invention is not limited to those contents. Other embodiments considered within the technical idea of the present invention are also included within the scope of the present invention.

The disclosed content of the following priority application is incorporated herein as a reference.

Japanese Patent Application No. 2016-117250 (filed on Jun. 13, 2016)

REFERENCE SIGNS LIST 1, 1a, 1b, 1c, 1d, 1e, 1f: Software update system
2: Vehicle
3: Server
4: Smartphone
202: Update unit
251: HMI registration unit
252: HMI management DB
253: HMI selection unit
254: Transmission unit

The invention claimed is:

1. A software update device comprising:
a database for storing transmission destination information of a plurality of human machine interface (HMI) devices each including a display device;
a processor;
a memory in communication with the processor, the memory storing a plurality of instructions executable by the processor to cause the software update device to:
select an HMI device among the plurality of HMI devices;
update software of an in-vehicle device;
receive the transmission destination information of the selected HMI device from the database;
send a notification message regarding the update to the selected HMI device;
display an update message on the selected HMI device;
switch from the selected HMI device to another HMI device of the plurality of HMI devices, which is different from the selected HMI device, to display the update message in response to starting to update the software;
confirm presence or absence of a response from a user to the notification message in the selected HMI device;
when the response is not confirmed within a certain time after sending the notification message to the selected HMI device, select again one HMI device among the plurality of HMI devices that are not selected; and
send again the notification message to the selected one HMI device.

2. The software update device according to claim 1, wherein
the memory further comprises instructions executable by the processor to cause the software update device to:
select one HMI device among the plurality of HMI devices when performing the update.

3. The software update device according to claim 1, wherein
the memory further comprises instructions executable by the processor to cause the software update device to:
select one HMI device different from an HMI device to be updated when software of any one of the plurality of HMI devices is updated.

4. The software update device according to claim 1, wherein
the in-vehicle device is at least one of an electronic control unit or a navigation device of a vehicle, and
the HMI device is at least one of the navigation device and a portable terminal.

5. The software update device according to claim 1, wherein
the notification message is diagnosis information of a vehicle on which the in-vehicle device is mounted.

6. The software update device according to claim 1, wherein
the memory further comprises instructions executable by the processor to cause the software update device to:
detect a touch of a user on the HMI device, and
select an HMI device detected to have been touched by the user among the plurality of HMI devices.

7. The software update device according to claim 1, wherein
the memory further comprises instructions executable by the processor to cause the software update device to:
select one HMI device designated by the user among the plurality of HMI devices.

8. The software update device according to claim 1, wherein
the memory further comprises instructions executable by the processor to cause the software update device to:
detect that each of the plurality of HMI devices is in a usable state, and
select one HMI device among the plurality of HMI devices, which is detected to be in a usable state.

9. The software update device according to claim 1, wherein the memory further comprises instructions executable by the processor to cause the software update device to:
receive a state of a vehicle on which the in-vehicle device is mounted, and
select one HMI device among the plurality of HMI devices when the received state of the vehicle is changed.

10. A software update device comprising:
a database for storing transmission destination information of a plurality of human machine interface (HMI) devices each including a display device;
a processor;

a memory in communication with the processor, the memory storing a plurality of instructions executable by the processor to cause the software update device to:
select an HMI device among the plurality of HMI devices;
update software of an in-vehicle device;
receive the transmission destination information of the selected HMI device from the database;
send a notification message regarding the update to the selected HMI device;
display an update message on the selected HMI device;
switch from the selected HMI device to another HMI device of the plurality of HMI devices, which is different from the selected HMI device, to display the update message in response to starting to update the software;
receive a distance between a location where each of the plurality of HMI devices is located and a location where the software update device is located, and
when the distance received regarding the selected HMI device is equal to or greater than a predetermined distance, select one HMI device among the plurality of HMI devices that are not selected.

11. A software update system comprising:
a processor for executing certain software;
a server for distributing software of the processor;
a plurality of human machine interface (HMI) devices each including a display device; and
a software update device including:
   a database storing transmission destination information of the plurality of HMI devices,
   a memory in communication with the processor, the memory storing a plurality of instructions executable by the processor to cause the software update device to:
   receive the software from the server;
   select an HMI device among the plurality of HMI devices,
   update software of an in-vehicle device with the received software,
   receive the transmission destination information of the selected HMI device from the database;
   send a notification message regarding the update to the selected HMI device,
   display an update message on the selected HMI device,
   switch from the selected HMI device to another HMI device of the plurality of HMI devices to display the update message in response to starting to update the software,
   confirm presence or absence of a response from a user to the notification message in the selected HMI device,
   when the response is not confirmed within a certain time after sending the notification message to the selected HMI device, select again one HMI device among the plurality of HMI devices that are not selected, and
   send again the notification message to the selected one HMI device.

* * * * *